United States Patent
Arikawa

(10) Patent No.: US 12,381,630 B2
(45) Date of Patent: Aug. 5, 2025

(54) COMMUNICATION SYSTEM, RECEIVER, DISTORTION DETECTION DEVICE, AND METHOD

(71) Applicant: NEC Corporation, Tokyo (JP)

(72) Inventor: Manabu Arikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 238 days.

(21) Appl. No.: 18/032,647

(22) PCT Filed: Apr. 20, 2021

(86) PCT No.: PCT/JP2021/016026
§ 371 (c)(1),
(2) Date: Apr. 19, 2023

(87) PCT Pub. No.: WO2022/091452
PCT Pub. Date: May 5, 2022

(65) Prior Publication Data
US 2024/0007193 A1    Jan. 4, 2024

(30) Foreign Application Priority Data
Oct. 28, 2020 (JP) ................................. 2020-180884

(51) Int. Cl.
*H04B 10/61* (2013.01)
*H04B 10/2507* (2013.01)
*H04J 14/06* (2006.01)

(52) U.S. Cl.
CPC ......... *H04B 10/61* (2013.01); *H04B 10/2507* (2013.01); *H04J 14/06* (2013.01)

(58) Field of Classification Search
CPC ... H04B 10/29; H04B 10/40; H04B 10/61–65
See application file for complete search history.

(56) References Cited

U.S. PATENT DOCUMENTS

| 9,692,521 B1 | 6/2017 | Zhou et al. |
| 2018/0083712 A1* | 3/2018 | Zhuge .................... H04B 10/58 |

(Continued)

FOREIGN PATENT DOCUMENTS

| JP | 2019-041285 A | 3/2019 |
| JP | 2019-047261 A | 3/2019 |
| JP | 2020-141294 A | 9/2020 |

OTHER PUBLICATIONS

Da Silva et al.; "Widely Linear Equalization for IQ Imbalance and Skew Compensation in Optical Coherent Receivers," Journal of Lightwave Technology, vol. 34, No. 15, pp. 3577-3586, 1 Aug. 1, 2016, doi: 10.1109/JLT.2016.2577716. (Year: 2016).*

(Continued)

*Primary Examiner* — Nathan M Cors
(74) *Attorney, Agent, or Firm* — Sughrue Mion, PLLC

(57) ABSTRACT

A coherent receiving circuit coherently receives a signal transmitted via a transmission line. A filter group includes a first WL filter, a filter layer, and a second WL filter being connected in tandem. A coefficient updating means adaptively controls filter coefficients of the first WL filter and the second WL filter by using an error back propagation method, based on a difference between an output signal being output from the filter group and a predetermined value thereof. A first distortion detection means detects in-receiver distortion, based on a filter coefficient of the first WL filter. A second distortion detection means detects in-transmitter distortion, based on a filter coefficient of the second WL filter.

20 Claims, 20 Drawing Sheets

(56) References Cited

U.S. PATENT DOCUMENTS

2022/0149974 A1\* 5/2022 Kobayashi ......... H04B 10/6161
2023/0120581 A1\* 4/2023 Yoshida ............. H04B 10/5161
398/208

OTHER PUBLICATIONS

Arikawa et al., "Adaptive equalization of transmitter and receiver IQ skew by multi-layer linear and widely linear filters with deep unfolding," Opt. Express 28, 23478-23494 (2020). (Year: 2020).\*
International Search Report for PCT Application No. PCT/JP2021/016026, mailed on Jul. 13, 2021.
Chris R. S. Fludger et al., "Transmitter Impairment Mitigation and Monitoring for High Baud-Rate, High Order Modulation Systems", ECOC 2016: 42nd European Conference on Optical Communication, pp. 256-258, Dec. 5, 2016.
Rafael Rios-Müller et al., "Blind Receiver Skew Compensation and Estimation for Long-Haul Non-Dispersion Managed Systems Using Adaptive Equalizer", Journal of Lightwave Technology, vol. 33, Issue: 7, pp. 1315-1318, Dec. 4, 2014.
Edson Porto da Silva et al., "Widely Linear Equalization for IQ Imbalance and Skew Compensation in Optical Coherent Receivers", Journal of Lightwave Technology, vol. 34, Issue: 15, pp. 3577-3586, Jun. 7, 2016.
Manabu Arikawa et al., "Adaptive equalization of transmitter and receiver IQ skew by multi-layer linear and widely linear filters with deep unfolding", Optics Express, vol. 28, No. 16, pp. 23478-23494, Aug. 3, 2020.

\* cited by examiner

COMMUNICATION SYSTEM, RECEIVER, DISTORTION DETECTION DEVICE, AND METHOD

This application is a National Stage Entry of PCT/JP2021/016026 filed on Apr. 20, 2021, which claims priority from Japanese Patent Application 2020-180884 filed on Oct. 28, 2020, the contents of all of which are incorporated herein by reference, in their entirety.

TECHNICAL FIELD

The present disclosure relates to a communication system, a receiver, a distortion detection device, a distortion detection method, and a computer readable medium.

BACKGROUND ART

In optical fiber communication, a multi-level modulation scheme such as high-order quadrature amplitude modulation (QAM) has been employed in order to achieve high spectrum utilization efficiency. Since introduction of coherent reception technology, flexible equalization processing such as collective compensation on a receiving side by digital signal processing of wavelength dispersion to be accumulated in an optical fiber transmission line has become possible. However, in general, a high-order multi-level modulation signal is vulnerable to distortion, and distortion caused by imperfection or the like in components of a transceiver is becoming a new bottleneck in advancing high multi-level modulation.

In order to address the above-described problem, high-precision equalization processing or highly accurate calibration of a component in advance is required. In general, in order to perform highly accurate calibration of distortion, highly accurate detection of actually occurring distortion is required. Even when a receiver is provided with high-precision equalization processing, highly accurate detection capability on the occurring distortion provides a means for identifying a vulnerable portion or an abnormal portion on a system, and contributes to stabilization of the system.

In the following, in particular, attention is paid to detection of distortion occurring in a transceiver. In a typical coherent communication system, in the transceiver, discrepancy in average signal strength between an in-phase (I) component and a quadrature (Q) component (IQ imbalance), a time lag between IQ components (IQ skew), and a quadrature shift between IQ components (IQ phase shift) occur mainly.

As a distortion detection method, a method of detecting distortion by using a filter coefficient after convergence of an adaptive equalization filter to be used for distortion compensation is known. In adaptive equalization, filter coefficients are sequentially controlled in such a way that a filter output approaches a desired property. In adaptive equalization, with a magnitude of a difference between the filter output and the desired property as a loss function, the filter coefficients are sequentially controlled in such a way as to minimize the loss function, based on a gradient descent method.

Ideally, a filter after proper control convergence is responsive to compensate for distortion. In other words, the filter coefficient after convergence includes information of the compensated distortion. An example of applying such a distortion detection method using filter coefficients after convergence of an adaptive equalization filter to distortion in a transmitter or a receiver has been reported.

As a related art, Non Patent Literature 1 discloses detecting in-transmitter distortion from a filter that compensates for the in-transmitter distortion. FIG. 12 illustrates digital signal processing of performing in-transmitter distortion compensation and in-transmitter distortion detection. The digital signal processing includes a filter to be used in a common polarization multiplexed coherent communication system. The filter includes an in-receiver distortion compensating filter 501, a wavelength dispersion compensating filter 502, a polarization fluctuation compensating (sometimes referred to as polarization separation) filter 503, a carrier phase compensating filter 504, and an in-transmitter distortion compensating filter 505.

A total of four real received signal sequences of an in-phase (I) component and a quadrature (Q) component, with respect to local oscillator light, of each of two polarizations of X and Y are input to the filter. The in-receiver distortion compensating filter 501, the wavelength dispersion compensating filter 502, the carrier phase compensating filter 504, and the in-transmitter distortion compensating filter 505 compensate for in-receiver distortion, wavelength dispersion, carrier phase, and in-transmitter distortion for each polarization. Meanwhile, the polarization fluctuation compensating filter 503 handles both of two polarizations.

Among the above-described filters, the in-receiver distortion compensating filter 501 and the wavelength dispersion compensating filter 502 are quasi-static filters. The in-receiver distortion compensating filter 501 and the wavelength dispersion compensating filter 502 use coefficients prepared based on a physical model of distortion or the like. The coefficients of the in-receiver distortion compensating filter 501 and the wavelength dispersion compensating filter 502 are not adaptively controlled with temporal granularity per symbol. Meanwhile, the polarization fluctuation compensating filter 503 and the in-transmitter distortion compensating filter 505 use coefficient updating units 510 and 520, respectively, whereby coefficients are adaptively controlled based on each output. As for the carrier phase compensating filter 504, a compensation amount varies in time, but coefficients of the carrier phase compensating filter 504 are separately calculated by using a method using a pilot signal, or the like.

FIG. 13 illustrates an adaptive filter that performs polarization fluctuation compensation. In the polarization fluctuation compensating filter 503, IQ components of each of the X and Y polarizations are converted into complex signals by using a complex conversion unit 601. The polarization fluctuation compensating filter 503 is configured as a complex coefficient 2×2 multiple-input and multiple-output (MIMO) filter of complex signal 2 inputs and 2 outputs. The polarization fluctuation compensating filter 503 includes, for example, a 2×2 finite impulse response (FIR) filter 602. A complex signal being output from the FIR filter 602 is converted into IQ components of each of X and Y polarizations, by using an inverse conversion unit 603.

The coefficient updating unit 510 updates coefficients of each FIR filter 602. Constant modulus algorithm (CMA) and decision directed least mean square (DDLMS) are well known as examples of algorithm for updating filter coefficients. The coefficient updating unit 510 uses a magnitude of a difference between the filter output and the desired property as a loss function. The coefficient updating unit 510 updates the filter coefficients for minimizing the loss function, based on a stochastic gradient descent method in such a way that the filter output approaches the desired property.

For example, in a CMA, a magnitude of a difference between an amplitude of the output and a desired value is used as a loss function. For a linear filter such as a typical FIR filter, this loss function can be differentiated with respect to the filter coefficient and a gradient thereof can be calculated. The coefficient updating unit 510 updates the coefficient in a direction in which the loss function is stochastically minimized by using the gradient related to the filter coefficient of the loss function.

FIG. 14 illustrates a portion of an in-transmitter distortion compensating filter. The IQ imbalance, IQ skew, and IQ phase shift, which are main in-transmitter distortions, have different effects on each of the IQ components. Therefore, the general complex signal input complex coefficient MIMO filter as illustrated in FIG. 13 cannot compensate for IQ imbalance, IQ skew, and IQ phase shift. In Non Patent Literature 1, an adaptive MIMO filter for in-transmitter distortion compensation is used in the in-transmitter distortion compensating filter 505. By using the in-transmitter distortion detection unit 550, in-transmitter distortion is detected from filter coefficients of the adaptive MIMO filter for in-transmitter distortion compensation.

FIG. 15 illustrates an adaptive MIMO filter to be used in an in-transmitter distortion compensating filter. An adaptive MIMO filter 610 is configured as a real coefficient 2×2 MIMO filter with IQ components as inputs and real signal 2 inputs and 2 outputs that handle the IQ components independently. The adaptive MIMO filter 610 includes, for example, a 2×2 FIR filter 611. The in-transmitter distortion compensating filter 505 has two of the adaptive MIMO filters 610 in response to the X and Y polarizations, respectively.

The coefficient updating unit 520 updates coefficients of each FIR filter 611. Adaptive control of coefficients in the in-transmitter distortion compensating filter 505 may be the same as adaptive control of coefficients in the polarization fluctuation compensating filter 503. The in-transmitter distortion detection unit 550 detects in-transmitter distortion from the coefficient of the adaptive MIMO filter 610. For example, IQ imbalance is described in Non Patent Literature 1.

In Non Patent Literature 1, the filter includes an in-receiver distortion compensating filter 501 (see FIG. 12). The in-receiver distortion compensating filter 501 is a filter for compensating for known distortion, and is not a filter whose coefficients are adaptively controlled. It is assumed that the coefficients of the in-receiver distortion compensating filter 501 are updated by using general adaptive control. Since the in-receiver distortion compensating filter 501 is located in a first stage of a series of filters, there remains much uncompensated distortion in an output thereof. Therefore, it is difficult to adaptively control coefficients of the filter, based on direct output of the in-receiver distortion compensating filter 501. Adaptive compensation of in-receiver distortion and distortion detection require another approach.

As another related art, Non Patent Literature 2 discloses detecting in-receiver distortion from a filter that compensates for the in-receiver distortion. FIG. 16 illustrates digital signal processing of performing in-receiver distortion compensation and in-receiver distortion detection. The digital signal processing includes an individual wavelength dispersion compensating filter 701, a widely linear (WL) polarization fluctuation compensating filter 702, and a carrier phase compensating filter 703. The individual wavelength dispersion compensating filter 701 compensates for wavelength dispersion. When compensating for distortion due to wavelength dispersion, the individual wavelength dispersion compensating filter 701 independently performs individual wavelength dispersion compensation for each IQ component in such a way that mixing does not occur between the IQ components.

After the wavelength dispersion is compensated, the WL polarization fluctuation compensating filter 702 performs polarization fluctuation compensation and in-receiver distortion compensation. The WL polarization fluctuation compensating filter 702 includes an adaptive WL 4×2 MIMO filter. FIG. 17 illustrates a WL 4×2 MIMO filter to be used in the WL polarization fluctuation compensating filter 702. A WL 4×2 MIMO filter 620 has 4×2=8 complex coefficient filters 623. The 4×2 complex coefficient filters can be regarded as 4×2×2=16 real coefficient filters.

As described in Non Patent Literature 3, a complex signal and a complex conjugate thereof are input to the WL MIMO filter 620. IQ components of the X polarization and IQ components of the Y polarization are respectively converted into complex data of the X polarization and complex data of the Y polarization in a complex conversion unit 621. Further, the converted complex data of the X polarization and complex data of the Y polarization are converted into complex conjugate data of the X polarization and complex conjugate data of the Y polarization in a complex conjugate conversion unit 622, respectively. The complex data of the X polarization, the complex data of the Y polarization, the complex conjugate data of the X polarization, and the complex conjugate data of the Y polarization are input to the complex coefficient filter 623 of the WL MIMO filter 620. A complex signal being output from the complex coefficient filter 623 is converted into IQ components of each of X and Y polarizations by using an inverse conversion unit 624.

The WL 4×2 MIMO filter is equivalent to a real-signal-input real-coefficient 4×4 MIMO filter having 4×4=16 real coefficient filters. In the present disclosure, a complex coefficient MIMO filter having a complex signal and a complex conjugate thereof as inputs and a real-signal-input real-coefficient MIMO filter equivalent thereto are collectively referred to as a WL MIMO filter. In this context, a typical complex-signal-input complex-coefficient MIMO filter is referred to as a strictly linear (SL) MIMO filter.

The coefficient updating unit 710 updates coefficients of each filter of the WL polarization fluctuation compensating filter 702, i.e., the WL MIMO filter. Adaptive control of the coefficients is the same as the control described above. The in-receiver distortion detection unit 750 detects in-receiver distortion from the coefficients of the WL MIMO filter.

CITATION LIST

Non Patent Literature

[Non Patent Literature 1] Chris R. S. Fludger and Theo Kupfer, "Transmitter impairment mitigation and monitoring for high baud-rate, high order modulation systems", ECOC 2016; 42nd European Conference on Optical Communication, 18-22 Sep. 2016

[Non Patent Literature 2] Rafael Rios-Muller, et. al., "Blind Receiver Skew Compensation and Estimation for Long-Haul Non-Dispersion Managed Systems Using Adaptive Equalizer", Journal of Lightwave Technology (Volume: 33, Issue: 7, April 1, 1 2015), 4 Dec. 2014

[Non Patent Literature 3] Edson Porto da Silva, et. al., "Widely Linear Equalization for IQ Imbalance and Skew Compensation in Optical Coherent Receivers", Journal of Lightwave Technology (Volume: 34, Issue: 15, August 1, 1 2016), 7 Jun. 2016

SUMMARY OF INVENTION

Technical Problem

As described above, a method is known in which in-transmitter distortion and in-receiver distortion are each compensated by using an adaptive filter, and distortion is detected from coefficients of the adaptive filter. However, in general, distortion in the transmitter and distortion in the receiver occur simultaneously. This makes it difficult to apply a distortion detection method in the related art. As described above, in FIG. 12, since another distortion remains in a filter output immediately after the in-receiver distortion compensating filter 501, adaptive control of the filter based on direct output of the in-receiver distortion compensating filter 501 is difficult. Similarly, in a case of FIG. 16, even when the in-transmitter distortion compensating filter 505 is arranged in a subsequent stage of the carrier phase compensating filter 703 as illustrated in FIG. 12, the in-transmitter distortion is not compensated immediately after the WL polarization fluctuation compensating filter 702. Therefore, accuracy of adaptive control of coefficients of the WL polarization fluctuation compensating filter deteriorates.

In Non Patent Literature 1, if the in-receiver distortion is calibrated with high accuracy in the receiver, the in-transmitter distortion detection unit 550 can accurately detect the in-transmitter distortion from the in-transmitter distortion compensating filter 505. Further, in Non Patent Literature 2, if the in-transmitter distortion is calibrated with high accuracy in the transmitter, the in-receiver distortion detection unit 750 can accurately detect the in-receiver distortion from the WL polarization fluctuation compensating filter 702. However, preparing a transmitter or a receiver that is calibrated in advance with high accuracy leads to a large increase in cost in distortion detection, which is not realistic.

In view of the above-described circumstance, an object of the present disclosure is to provide a communication system, a receiver, a distortion detection device, a distortion detection method, and a computer readable medium that are capable of accurately detecting distortion in a transmitter and distortion in a receiver without increasing cost.

Solution to Problem

In order to achieve the above object, according to a first aspect of the present disclosure, there is provided a receiver including: a coherent receiving circuit configured to coherently receive a signal transmitted via a transmission line; a filter group having a first WL filter, a filter layer, and a second WL filter that are connected in tandem, the first WL filter compensating for in-receiver distortion occurring in the signal in a receiver, the filter layer including one or more filters that compensate for distortion included in the signal, the second WL filter compensating for in-transmitter distortion occurring in the signal in a transmitter configured to transmit the signal; a coefficient updating means for adaptively controlling filter coefficients of the first WL filter and the second WL filter by using an error back propagation method, based on a difference between an output signal being output from the filter group and a predetermined value of the output signal; a first distortion detection means for detecting in-receiver distortion after convergence of the filter coefficients, based on the filter coefficient of the first WL filter; and a second distortion estimation means for detecting in-transmitter distortion after convergence of the filter coefficients, based on the filter coefficient of the second WL filter.

According to a second aspect of the present disclosure, there is provided a communication system including: a transmitter configured to transmit a signal via a transmission line; and a receiver configured to receive the transmitted signal, wherein the receiver includes: a coherent receiving circuit configured to coherently receive the signal; a filter group having a first WL filter, a filter layer, and a second WL filter that are connected in tandem, the first WL filter compensating for in-receiver distortion occurring in the signal in the receiver, the filter layer including one or more filters that compensate for distortion included in the signal, the second WL filter compensating for in-transmitter distortion occurring in the signal in the transmitter; a coefficient updating means for adaptively controlling filter coefficients of the first WL filter and the second WL filter by using an error back propagation method, based on a difference between an output signal being output from the filter group and a predetermined value of the output signal; a first distortion detection means for detecting in-receiver distortion after convergence of the filter coefficients, based on the filter coefficient of the first WL filter; and a second distortion estimation means for detecting in-transmitter distortion after convergence of the filter coefficients, based on the filter coefficient of the second WL filter.

According to a third aspect of the present disclosure, there is provided a distortion detection device including: a coefficient updating means for adaptively controlling filter coefficients of a first WL filter and a second WL filter by using an error back propagation method, based on a difference between an output signal being output from a filter group and a predetermined value of the output signal, the first WL filter compensating for in-receiver distortion occurring in a signal transmitted via a transmission line in a receiver configured to coherently receive the signal, the second WL filter compensating for in-transmitter distortion occurring in the signal in a transmitter configured to transmit the signal, the filter group having the first WL filter, a filter layer, and the second WL filter that are connected in tandem, the filter layer including one or more filters that compensate for distortion included in the signal; a first distortion detection means for detecting in-receiver distortion after convergence of the filter coefficients, based on the filter coefficient of the first WL filter; and a second distortion estimation means for detecting in-transmitter distortion after convergence of the filter coefficients, based on the filter coefficient of the second WL filter.

According to a fourth aspect of the present disclosure, there is provided a distortion detection method including: adaptively controlling filter coefficients of a first WL filter and a second WL filter by using an error back propagation method, based on a difference between an output signal being output from a filter group and a predetermined value of the output signal, the first WL filter compensating for in-receiver distortion occurring in a signal transmitted via a transmission line in a receiver configured to coherently receive the signal, the second WL filter compensating for in-transmitter distortion occurring in the signal in a transmitter configured to transmit the signal, the filter group having the first WL filter, a filter layer, and the second WL filter that are connected in tandem, the filter layer including one or more filters that compensate for distortion included in the signal; detecting, after convergence of the filter coefficients, in-receiver distortion, based on the filter coefficient of the first WL filter; and detecting, after convergence of the filter coefficients, in-transmitter distortion, based on the filter coefficient of the second WL filter.

According to a fifth aspect of the present disclosure, there is provided a computer readable medium storing a program for causing a processor to execute processing of: adaptively controlling filter coefficients of a first WL filter and a second WL filter by using an error back propagation method, based on a difference between an output signal being output from a filter group and a predetermined value of the output signal, the first WL filter compensating for in-receiver distortion occurring in a signal transmitted via a transmission line in a receiver configured to coherently receive the signal, the second WL filter compensating for in-transmitter distortion occurring in the signal in a transmitter configured to transmit the signal, the filter group having the first WL filter, a filter layer, and the second WL filter that are connected in tandem, the filter layer including one or more filters that compensate for distortion included in the signal; detecting, after convergence of the filter coefficients, in-receiver distortion, based on the filter coefficient of the first WL filter; and detecting, after convergence of the filter coefficients, in-transmitter distortion, based on the filter coefficient of the second WL filter.

Advantageous Effects of Invention

The communication system, the receiver, the distortion detection device, the distortion detection method, and the computer readable medium according to the present disclosure are able to accurately detect distortion in a transmitter and distortion in a receiver without increasing cost.

EXAMPLE EMBODIMENT

Figure 1A:
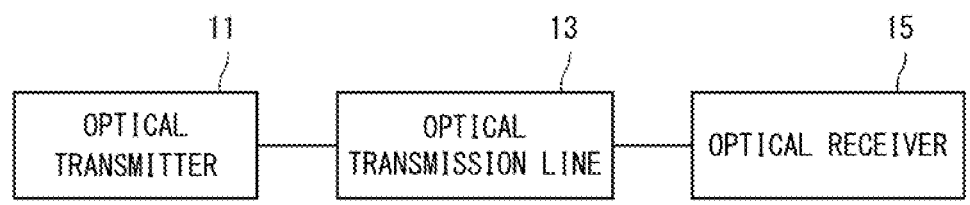
FIG. 1A is a block diagram schematically illustrating a communication system according to the present disclosure.

Prior to explanation of an example embodiments of the present disclosure, an outline of the present disclosure will be explained. FIG. 1A schematically illustrates a communication system according to the present disclosure. A communication system 10 includes a transmitter 11 and a receiver 15. The transmitter 11 and the receiver 15 are connected to each other via a transmission line 13. The transmitter 11 transmits a signal via the transmission line 13. The receiver 15 receives the signal transmitted from the transmitter 11 via the transmission line 13.

Figure 1B:
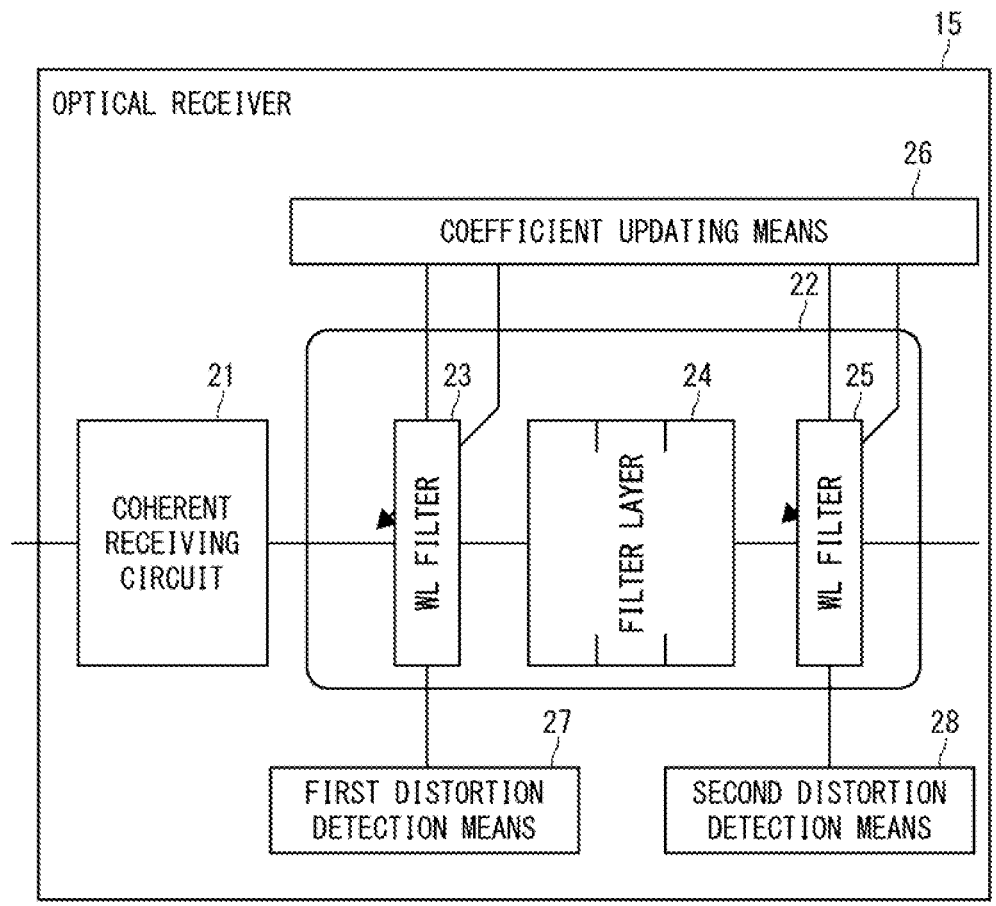
FIG. 1B is a block diagram schematically illustrating a receiver.

FIG. 1B illustrates a schematic configuration of the receiver 15. The receiver 15 includes a coherent receiving circuit 21, a filter group 22, a coefficient updating means 26, a first distortion detection means 27, and a second distortion detection means 28. The coherent receiving circuit 21 coherently receives a signal transmitted via the transmission line 13 (see FIG. 1A). The coherent receiving circuit 21 outputs the coherently-received signal to the filter group 22.

The filter group 22 includes a first WL filter 23, a filter layer 24, and a second WL filter, which are connected in tandem. The first WL filter 23 compensates for the in-receiver distortion occurring in the signal at the receiver 15. The filter layer 24 includes one or more filters to compensate for distortion included in the signal. The second WL filter 25 compensates for in-transmitter distortion occurring in the signal at the transmitter 11 (see FIG. 1A).

The coefficient updating means 26 adaptively controls filter coefficients of the first WL filter 23 and the second WL filter 25 by using an error back propagation method, based on a difference between an output signal being output from the filter group 22 and a predetermined value thereof (desired state). After convergence of the filter coefficients, the first distortion detection means 27 detects in-receiver distortion, based on the filter coefficient of the first WL filter 23. After convergence of the filter coefficients, the second distortion detection means 28 detects in-transmitter distortion, based on the filter coefficient of the second WL filter 25.

In the present disclosure, the coefficient updating unit 26 adaptively controls the filter coefficients of the first WL filter 23 and the second WL filter 25 by using the error back propagation method, based on the difference between the output signal being output from the second WL filter 25, which is a final stage of the filter group 22, and the desired state. In a state where adaptive control of the filter coefficients is converged, the filter coefficient of the first WL filter 23 is controlled to be a filter coefficient capable of compensating for in-receiver distortion, and the filter coefficient of the second WL filter 25 is controlled to be a filter coefficient capable of compensating for in-transmitter distortion. Therefore, the first distortion detection means 27 can detect the in-receiver distortion from the filter coefficient of the adaptively controlled first WL filter 23. Also, the second distortion detection means 28 can detect the in-transmitter distortion from the filter coefficient of the adaptively controlled second WL filter 25. In the present disclosure, even when the distortion is not calibrated with high accuracy in one of the transmitter and the receiver, the in-receiver distortion and the in-transmitter distortion can be detected. In addition, according to the present disclosure, since it is not necessary to prepare a transmitter or a receiver that has been calibrated in advance with high accuracy, it is possible to detect in-receiver distortion and in-transmitter distortion with high accuracy without increasing cost.

Figure 2:
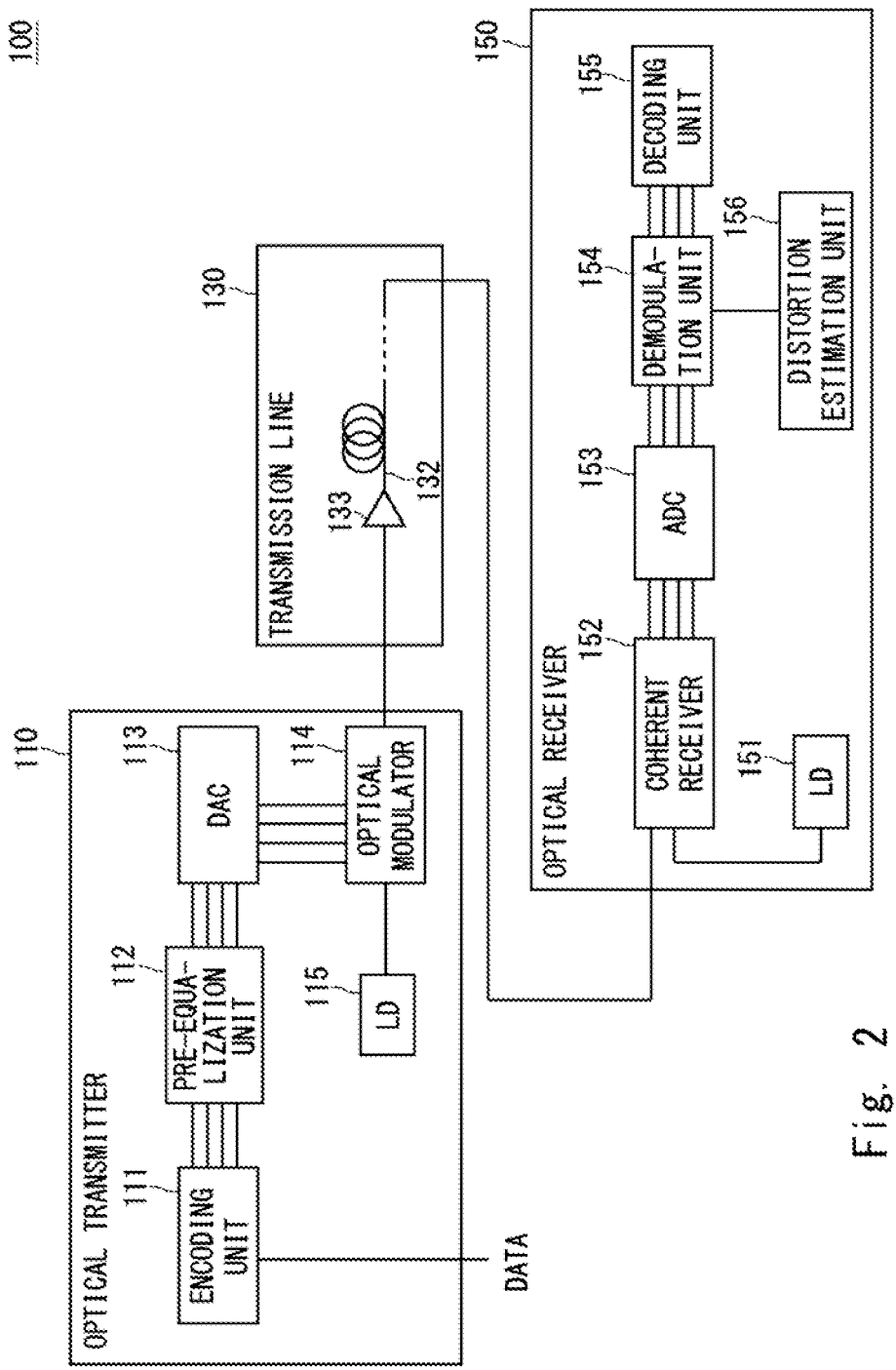
FIG. 2 is a block diagram illustrating a signal transmission system according to an example embodiment of the present disclosure.

Hereinafter, example embodiments of the present disclosure will be explained in detail. FIG. 2 illustrates a signal transmission system according to an example embodiment of the present disclosure. In the present example embodiment, it is assumed that the signal transmission system is an optical fiber communication system that employs a polarization multiplexing QAM system and performs coherent reception. An optical fiber communication system 100 includes an optical transmitter 110, a transmission line 130, and an optical receiver 150. The optical fiber communication system 100 constitutes, for example, an optical submarine cable system. The optical fiber communication system 100 is associated to the communication system 10 illustrated in FIG. 1A. The optical transmitter 110 is associated to the transmitter 11 illustrated in FIG. 1A. The transmission line 130 is associated to the transmission line 13 illustrated in FIG. 1A. The optical receiver 150 is associated to the receiver 15 illustrated in FIG. 1A.

The optical transmitter 110 converts a plurality of pieces of transmission data into a polarization multiplexed optical signal. The optical transmitter 110 includes an encoding unit 111, a pre-equalization unit 112, a Digital analog converter (DAC) 113, an optical modulator 114, and a Laser diode (LD) 115. The encoding unit 111 encodes data. The encoding unit 111 outputs, for example, signals of four sequences of in-phase (I) components and quadrature (Q) components of the X polarization (first polarization) and the Y polarization (second polarization).

The pre-equalization unit 112 performs pre-equalization to compensate distortion or the like of a device in the optical transmitter in advance for the encoded signals of four sequences. The DAC 113 converts the four sequences of signals on which the pre-equalization has been performed into analog electrical signals.

The LD 115 outputs Continuous wave (CW) light. The optical modulator 114 modulates the CW light being output from the LD 115 in accordance with four sequences of signals being output from the DAC 113, and generates a polarization-multiplexed optical signal. The optical modulator 114 generates, for example, a polarization-multiplexed QAM signal. The optical modulator 114 transmits the polarization-multiplexed optical signal to the transmission line 130.

The transmission line 130 transmits the polarization-multiplexed optical signal being output from the optical transmitter 110 to the optical receiver 150. The transmission line 130 includes an optical fiber 132 and an optical amplifier 133. The optical fiber 132 derives the optical signal transmitted from the optical transmitter 110. The optical amplifier 133 amplifies the optical signal and compensates for propagation loss in the optical fiber 132. The optical amplifier 133 is configured, for example, as an erbium doped fiber amplifier (EDFA). The transmission line 130 may include a plurality of the optical amplifiers 133.

The optical receiver 150 includes an LD 151, a coherent receiver 152, an Analog digital converter (ADC) 153, a demodulation unit 154, a decoding unit 155, and a distortion estimation unit 156. In the optical receiver 150, circuitry such as the demodulation unit (demodulator) 154, the decoding unit (decoder) 155, and the distortion estimation unit 156 may be configured by using a device such as a digital signal processor (DSP), for example.

The LD 151 outputs CW light that becomes local oscillator light. The coherent receiver 152 is configured as a polarization diversity coherent receiver. The coherent receiver 152 performs coherent detection on the optical signal transmitted through the optical fiber 132 by using the CW light being output from the LD 151. The coherent receiver 152 outputs received signals (electric signals) of four sequences equivalent to I components and Q components of the coherently detected X polarization and Y polarization. The coherent receiver 152 is associated to the coherent receiving circuit 21 illustrated in FIG. 1B.

The ADC 153 samples the received signal being output from the coherent receiver 152 and converts the received signal into a digital domain signal. The demodulation unit 154 performs digital signal processing on the four sequences of received signals sampled by the ADC 153 and demodulates the received signals. The decoding unit 155 decodes the demodulated signal and restores the transmitted data. The distortion estimation unit 156 detects the in-receiver distortion and the in-transmitter distortion.

Figure 3:
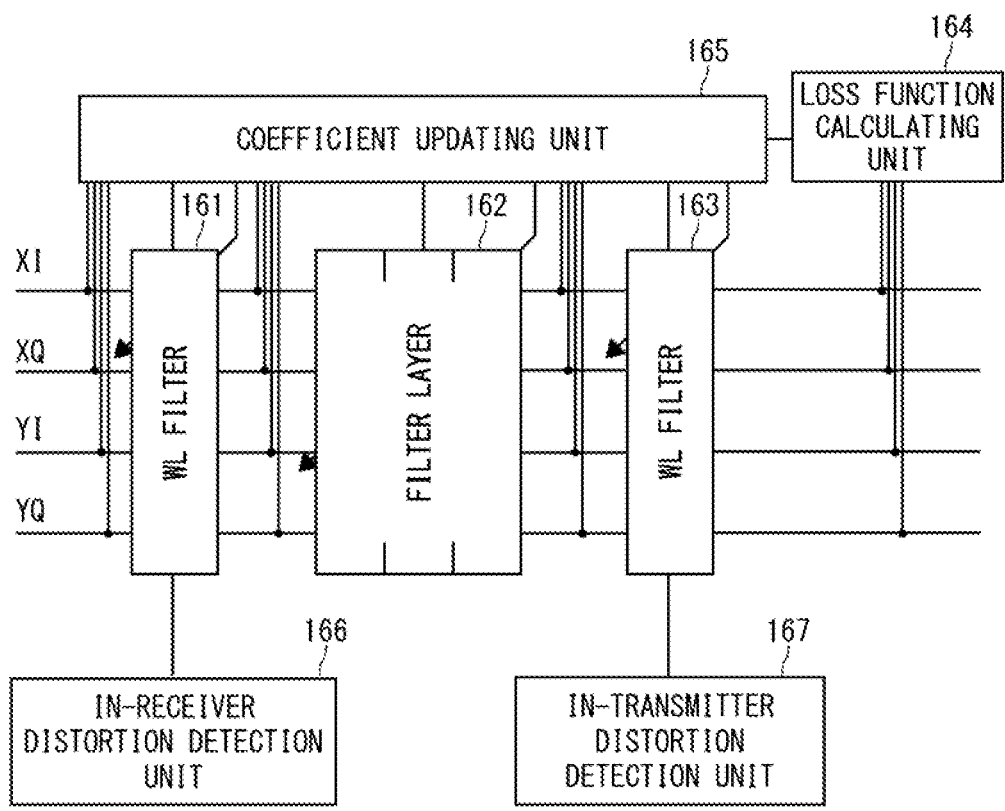
FIG. 3 is a block diagram illustrating a basic configuration of digital signal processing of performing demodulation and distortion detection.

FIG. 3 illustrates a basic configuration of digital signal processing of performing demodulation and distortion detection. The digital signal processing includes a first WL filter 161, a filter layer 162, a second WL filter 163, a loss function calculating unit 164, a coefficient updating unit 165, an in-receiver distortion detection unit 166, and an in-transmitter distortion detection unit 167. The first WL filter 161, the filter layer 162, the second WL filter 163, the loss function calculating unit 164, and the coefficient updating unit 165 may be included in the demodulation unit 154 illustrated in FIG. 2. The in-receiver distortion detection unit 166 and the in-transmitter distortion detection unit 167 are included in the distortion estimation unit 156.

In the digital signal processing, the first WL filter 161, the filter layer 162, and the second WL filter 163 are connected in tandem with respect to an input signal and arranged. The filter layer 162 includes one or more filters to compensate for distortion included in the input signal. The received signal of four sequences (XI, XQ, YI, and YQ) equivalent to the IQ components of each polarization, which are output from the ADC 153 (see FIG. 2), are input to the first WL filter 161, the filter layer 162, and the second WL filter. The first WL filter 161 is associated to the filter layer 162 and the second WL filter 163 is associated to the first WL filter 23, the filter layer 24, and the second WL filter 25 included in the filter group 22 illustrated in FIG. 1B.

The loss function calculating unit 164 calculates a loss function, based on a difference between an output signal of the second WL filter 163 which is a filter of the final stage and a desired state. The coefficient updating unit 165 adaptively controls the coefficients of at least the first WL filter 161 and the second WL filter 163 by the error back propagation method, based on the loss function. The coefficient updating unit 165 is associated to the coefficient updating unit 26 illustrated in FIG. 1B.

The in-receiver distortion detection unit 166 detects, after convergence of adaptive control of the coefficients, the in-receiver distortion from the filter coefficient of the first WL filter 161. The in-transmitter distortion detection unit 167 detects, after convergence of adaptive control of the coefficients, in-transmitter distortion from the filter coefficient of the second WL filter 163. The in-receiver distortion detection unit 166 is associated to the first distortion detection means 27 illustrated in FIG. 1B. The in-transmitter distortion detection unit 167 is associated to the second distortion detection means 28 illustrated in FIG. 1B.

Note that functions of the distortion estimation unit 156 (see FIG. 2) including the in-receiver distortion detection unit 166 and the in-transmitter distortion detection unit 167 may be achieved by using a computer apparatus such as a Personal Computer (PC). For example, the demodulation unit 154 has an interface for connecting to a PC, and the PC functioning as the distortion estimation unit 156 may acquire information such as filter coefficients of the first WL filter 161 and the second WL filter 163 through the interface.

Figure 4:
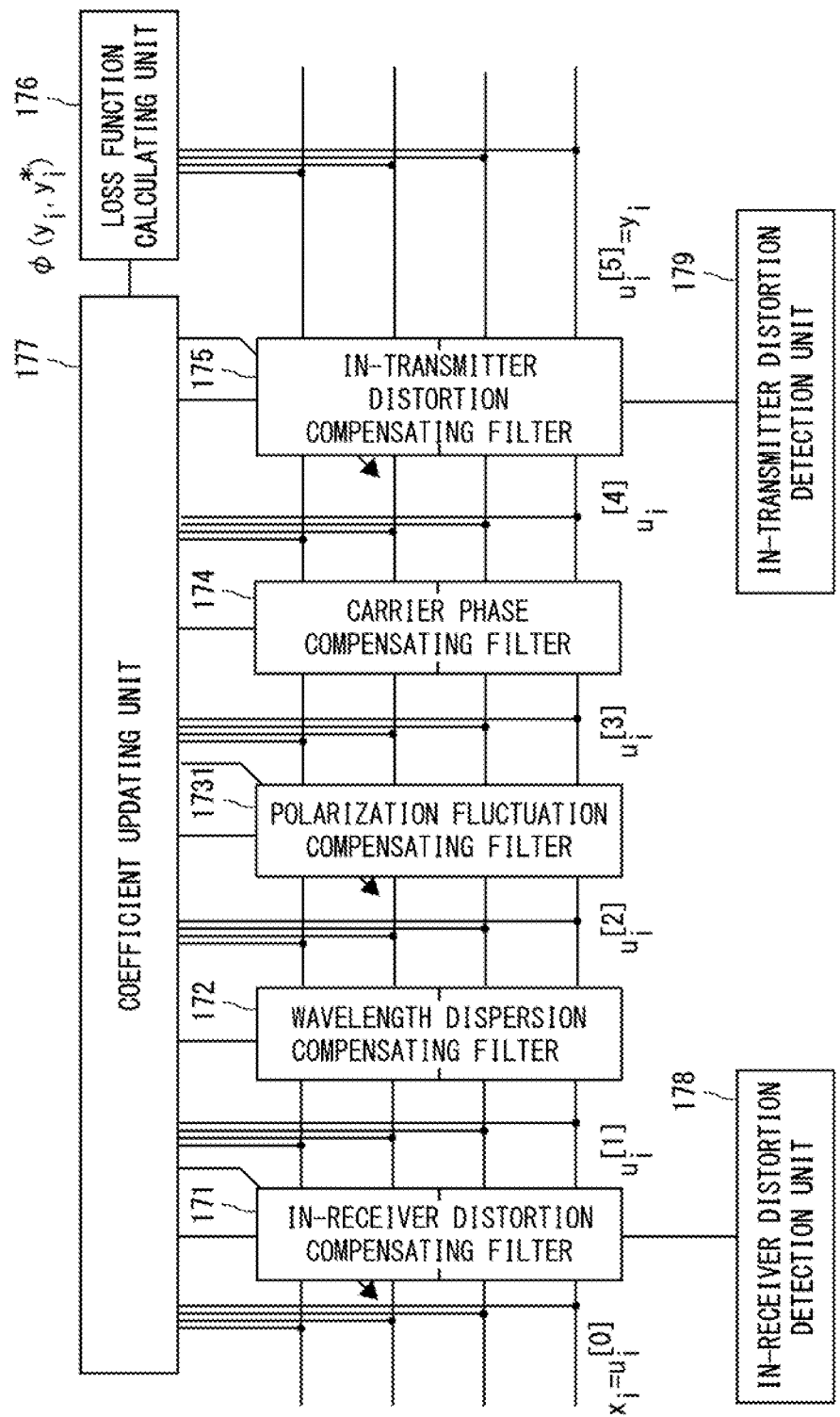
FIG. 4 is a block diagram illustrating a specific example of digital signal processing.

FIG. 4 illustrates a specific example of digital signal processing. The digital signal processing includes an in-receiver distortion compensating filter 171, a wavelength dispersion compensating filter 172, a polarization fluctuation compensating filter 173, a carrier phase compensating filter 174, an in-transmitter distortion compensating filter 175, a loss function calculating unit 176, a coefficient updating unit 177, an in-receiver distortion detection unit 178, and an in-transmitter distortion detection unit 179.

In FIG. 4, the in-receiver distortion compensating filter 171 is associated to the first WL filter 161 illustrated in FIG. 3. The wavelength dispersion compensating filter 172, the polarization fluctuation compensating filter 173, and the carrier phase compensating filter 174 are associated to filters included in the filter layer 162 illustrated in FIG. 3. The in-transmitter distortion compensating filter 175 is associated to the second WL filter 163 illustrated in FIG. 3. The loss function calculating unit 176 and the coefficient updating unit 177 are associated to the loss function calculating unit 164 and the coefficient updating unit 165 illustrated in FIG. 3, respectively. The in-receiver distortion detection unit 178 and the in-transmitter distortion detection unit 179 are associated to the in-receiver distortion detection unit 166 and the in-transmitter distortion detection unit 167 illustrated in FIG. 3, respectively.

Effects of wavelength dispersion, polarization fluctuation/polarization mode dispersion, and frequency/phase offset that occur in an optical fiber communication system can all be represented by complex (MIMO) filters, which are interchangeable. Namely, functional blocks that compensate for these are achieved by an SL (MIMO) filter, and an order between the blocks is not a concern. However, IQ skew and the WL (MIMO) filter that compensates for it are generally not interchangeable with these. Therefore, in the case of compensating for the distortion for each block including the IQ skew, the order is important.

Considering an optical fiber communication system, the distortion occurs in the following order: (1) distortion in the transmitter; (2) phenomena in the optical fiber (wavelength dispersion, polarization fluctuation/polarization mode dispersion); (3) frequency offset; and (4) distortion in the receiver. Herein, between (2) and (3), when the nonlinear effect in the optical fiber is ignored, it is interchangeable. In the present disclosure, filters that perform in-receiver distortion compensation, wavelength dispersion compensation, polarization fluctuation compensation, carrier phase compensation, and in-transmitter distortion compensation in this order are used in consideration of the order in which the distortion occurs and the interchangeability.

The in-receiver distortion compensating filter 171 compensates for signal distortion occurring in the optical receiver 150 (see FIG. 2). The wavelength dispersion compensating filter 172 compensates for signal distortion caused by wavelength dispersion during optical fiber transmission. The polarization fluctuation compensating filter 173 compensates for signal distortion caused by polarization state fluctuation and polarization mode dispersion during optical fiber transmission. The carrier phase compensating filter 174 compensates for signal distortion caused by the frequency offset and the phase offset between the carrier of the transmitted optical signal and the local oscillator light on the receiving side. The in-transmitter distortion compensating filter 175 compensates for signal distortion occurring in the optical transmitter 110.

Figure 12:
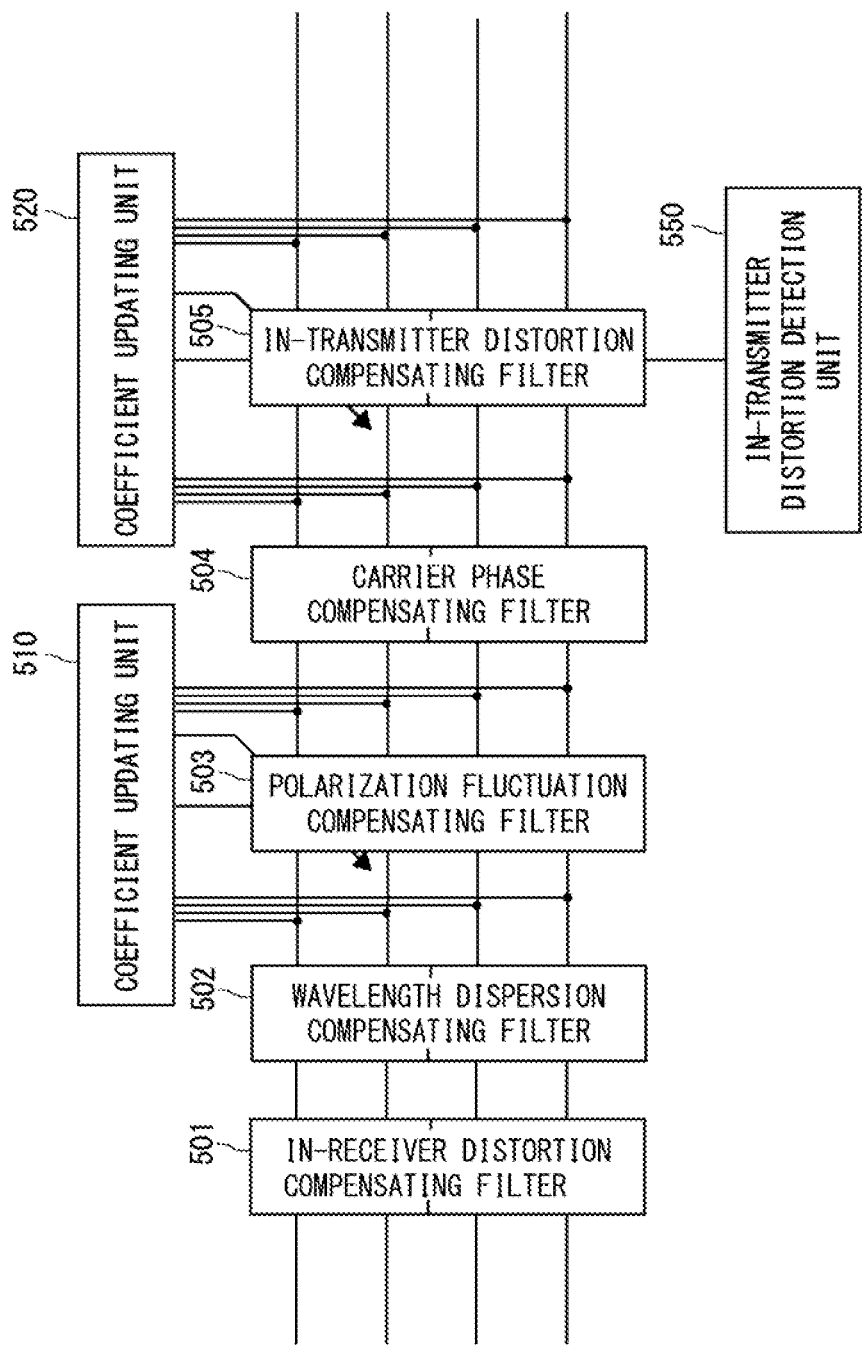
FIG. 12 is a block diagram illustrating digital signal processing for performing in-transmitter distortion compensation and in-transmitter distortion detection.
Figure 13:
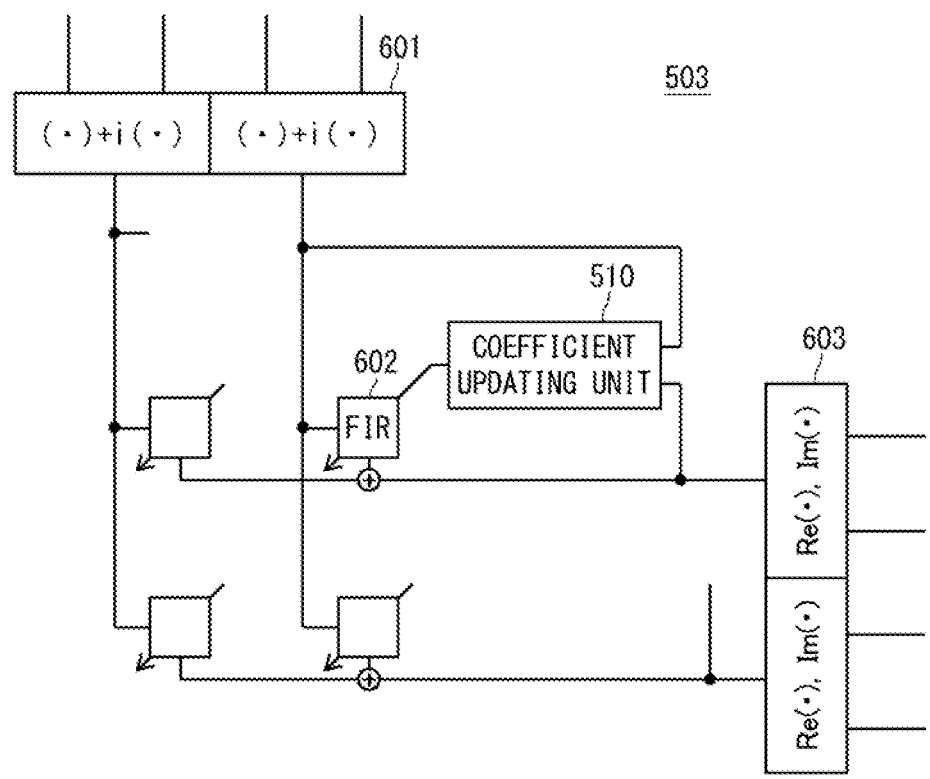
FIG. 13 is a block diagram illustrating an adaptive filter for performing polarization fluctuation compensation.
Figure 14:
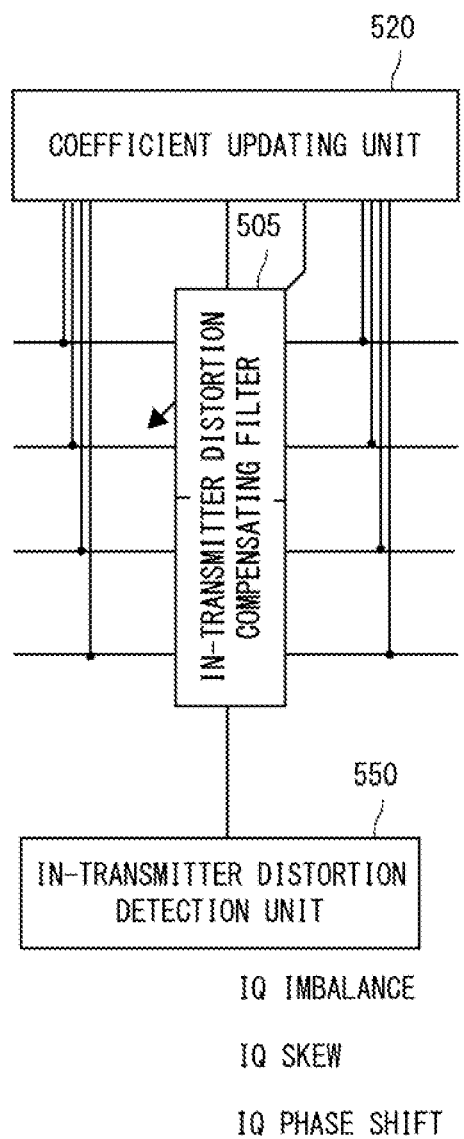
FIG. 14 is a block diagram illustrating a portion of an in-transmitter distortion compensating filter.
Figure 15:
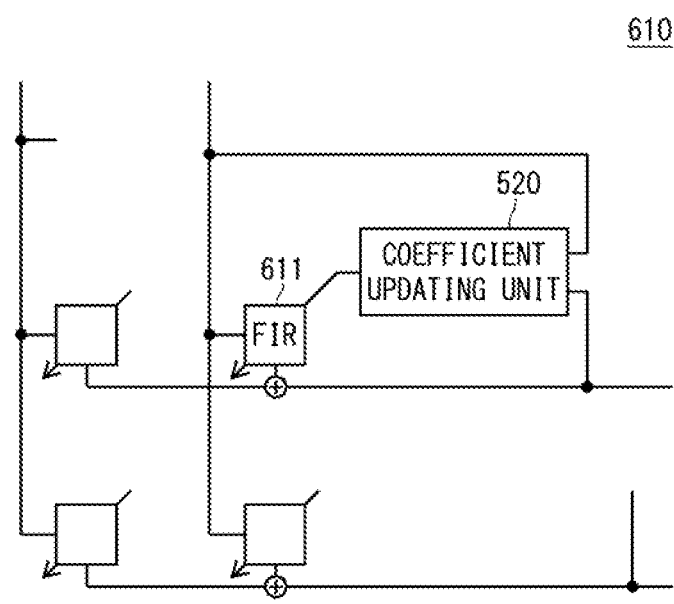
FIG. 15 is a block diagram illustrating an adaptive MIMO filter used in an in-transmitter distortion compensating filter.
Figure 16:
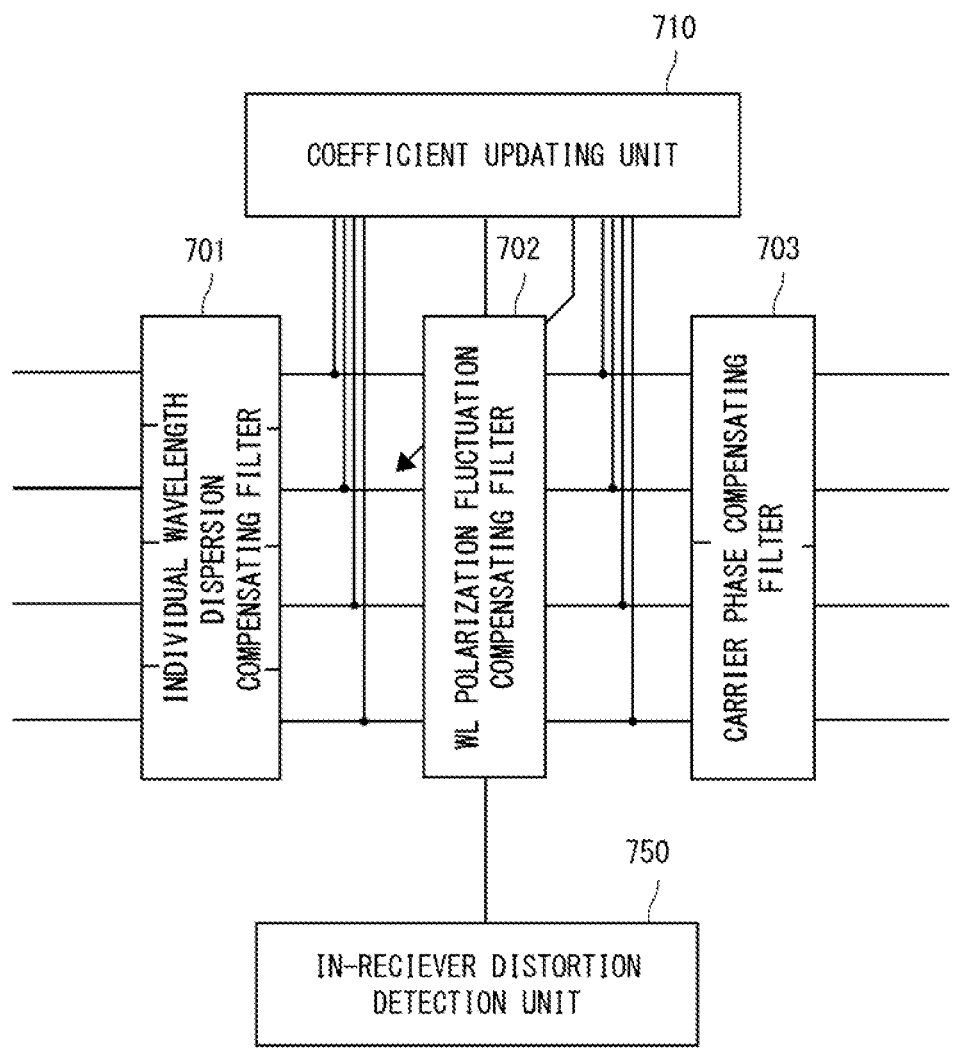
FIG. 16 is a block diagram illustrating digital signal processing for performing in-receiver distortion compensation and in-receiver distortion detection.
Figure 17:
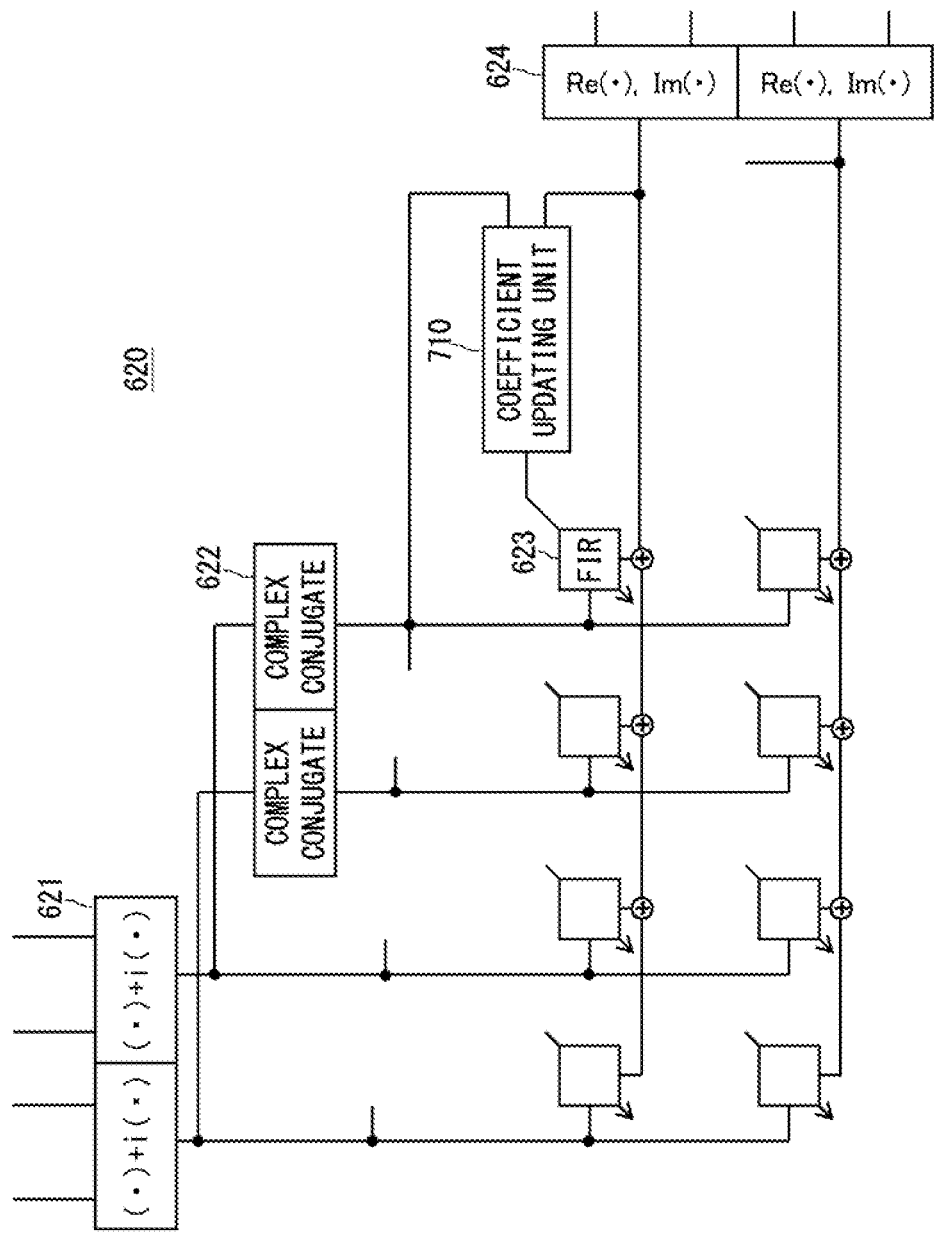
FIG. 17 is a block diagram illustrating a WL 4×2 MIMO filter.

The loss function calculating unit 176 calculates, as a loss function, a difference between an output of the in-transmitter distortion compensating filter 175, which is the final stage of the series of filters described above, and a desired state. The coefficient updating unit 177 updates the coefficient of each filter in such a way as to minimize the loss function. Herein, in the related art illustrated in FIGS. 12 and 16, the coefficient of the filter to be adaptively equalized are updated based on the output of the filter. On the other hand, in the present disclosure, the coefficients of the filters of respective stages including the filter of the preceding stage are updated based on the output of the final stage of the filter arranged in multiple layers. The in-receiver distortion detection unit 178 detects in-receiver distortion from the in-receiver distortion compensating filter 171, and the in-transmitter distortion detection unit 179 detects in-transmitter distortion from the in-transmitter distortion compensating filter 175.

For the in-receiver distortion compensating filter 171, the wavelength dispersion compensating filter 172, the polarization fluctuation compensating filter 173, the carrier phase compensating filter 174, and the in-transmitter distortion compensating filter 175, a filter having a configuration in which characteristics of the distortion to be compensated are taken into consideration is selected. Herein, it is assumed that an FIR filter is used for each filter.

The in-receiver distortion compensating filter 171 and the in-transmitter distortion compensating filter 175 are configured by using a WL filter, and in principle, it is not necessary to consider mixing between polarizations. Therefore, it is assumed that the in-receiver distortion compensating filter 171 and the in-transmitter distortion compensating filter 175 are configured as two WL 2×1 FIR arranged for each polarization. In the in-receiver distortion compensating filter 171 and the in-transmitter distortion compensating filter 175, the coefficients of each FIR filter are adaptively controlled.

The wavelength dispersion compensating filter 172 is configured as a (1×1) FIR filter without MIMO with two SLs arranged for each polarization. In the wavelength dispersion compensating filter 172, the coefficients of each FIR filter are treated as fixed coefficients. The polarization fluctuation compensating filter 173 is configured as a 2×2 FIR filter. In the polarization fluctuation compensating filter 173, the coefficients of each FIR filter are adaptively controlled.

The carrier phase compensating filter 174 is configured as two SL 1×1 1 tap FIR filters arranged for each polarization. The phase to be compensated by the carrier phase compensating filter 174 is separately calculated by an unillustrated method, based on the output of the in-transmitter distortion compensating filter 175, which is the filter of the final stage. For the calculation of the phase to be compensated, a common M-multiplication method or a digital Phase locked loop (PLL) using a tentative determination can be used. The number of taps of each FIR filter other than the carrier phase compensating filter is individually selected according to the compensated distortion.

The coefficient updating unit 177 updates the coefficients of each filter in such a way as to minimize the loss function calculated based on the filter output of the final stage by a stochastic gradient descent method. Updating the coefficients of each filter requires a gradient of the loss function for each filter coefficient. The gradient for the filter coefficient can be calculated by error back propagation, as explained below.

First, it is considered that filters in L (L is an integer of three or more) stages are connected in tandem. In the example of FIG. 4, L=5. Let $u_i^{[1]}[k]$ be a filter output (an output vector) of a l-th ($1 \leq l \leq L$) stage, and $u_i^{[l-1]}[k]$ be a filter input (an input vector) of the l-th stage at a time k (k is an integer). i=1, 2 represents each polarization. The following explanation allows easy extension even in the case of spatial multiplexing or the like by extending the value of i to the number of 2×modes. When a length of the input vector is $M_{in}^{[1]}$ and a length of the output vector is $M_{out}^{[1]}$, the input vector and the output vector are represented by Equations 1 and 2 below.

[Mathematical 1]

$$u_i^{[l]}[k] = (u_i^{[l]}[k], u_i^{[l]}[k-1], \ldots, u_i^{[l]}[k-M_{out}^{[l]}+1])^T \quad (1)$$

[Mathematical 2]

$$u_i^{[l-1]}[k] = (u_i^{[l-1]}[k], u_i^{[l-1]}[k-1], \ldots, u_i^{[l-1]}[k-M_{in}^{[l]}+1])^T \quad (2)$$

In the above equations, "T" represents transposition.

When the filter of the l-th stage is an SL MIMO filter (including the case of 1×1), it is assumed that a FIR filter coefficient (coefficient vector) $h_{ij}^{[l]}$ of a $M^{[l]}$ tap is represented by Equation 3 below.

[Mathematical 3]

$$h_{ij}^{[l]} = (h_{ij}^{[l]}[0], h_{ij}^{[l]}[1], \ldots, h_{ij}^{[l]}[M^{[l]}-1])^T \quad (3)$$

When the filter input (input vector) of the l-th stage is as follows,

[Mathematical 4]

$$\overline{u}_i^{[l-1]}[k] = (u_i^{[l-1]}[k], u_i^{[l-1]}[k-1], \ldots, u_i^{[l-1]}[k-M^{[l]}+1])^T \quad (4)$$

an output sample is represented by Equation 5 below.

[Mathematical 5]

$$u_i^{[l]}[k] = \sum_{j=1}^{2} h_{ij}^{[l]\dagger} \overline{u}_j^{[l-1]}[k] \quad (5)$$

Herein, "†" represents Hermitian conjugate.

From Equation 5 above, Equation 6 below is acquired.

[Mathematical 6]

$$u_i^{[l]}[k] = \sum_{j=1}^{2} H_{ij}^{[l]} * u_j^{[l-1]}[k] \quad (6)$$

"*" represents a complex conjugate, and $H_{ij}^{[l]}$ is represented by Equation 7 below.

[Mathematical 7]

$$H_{ij}^{[l]} = \begin{pmatrix} h_{ij}^{[l]}[0] & h_{ij}^{[l]}[1] & \cdots & h_{ij}^{[l]}[M^{[l]}-1] & 0 & \cdots & 0 \\ 0 & \ddots & \ddots & & \ddots & \ddots & \vdots \\ \vdots & & & & & & 0 \\ 0 & \cdots & 0 & h_{ij}^{[l]}[0] & h_{ij}^{[l]}[1] & \cdots & h_{ij}^{[l]}[M^{[l]}-1] \end{pmatrix} \quad (7)$$

When Equation 6 is modified, Equation 8 below is acquired.

[Mathematical 8]

$$u_i^{[l]}[k] = \sum_{j=1}^{2} U_j^{[l-1]}[k] h_{ij}^{[l]*} \quad (8)$$

In Equation 8, $U_j^{[l-1]}$ is represented by Equation 9 below.

[Mathematical 9]

$$U_j^{[l-1]} = \begin{pmatrix} u_j^{[l-1]}[k] & u_j^{[l-1]}[k-1] & \cdots & u_j^{[l-1]}[k-M^{[l]}+1] \\ u_j^{[l-1]}[k-1] & u_j^{[l-1]}[k-2] & \cdots & u_j^{[l-1]}[k-M^{[l]}] \\ \vdots & & & \vdots \\ u_j^{[l-1]}[k-M_{out}^{[l]}+1] & u_j^{[l-1]}[k-M_{out}^{[l]}] & \cdots & u_j^{[l-1]}[k-M_{in}^{[l]}+1] \end{pmatrix} \quad (9)$$

$M^{[l]}$ is represented by Equation 10 below.

[Mathematical 10]

$$M^{[l]} = M_{in}^{[l]} - M_{out}^{[l]} + 1 \quad (10)$$

When the filter of the l-th stage is a WL MIMO filter (including the case of 2×1), the $h_{ij}^{[l]}$ represented by Equation 3 and the $h_{*ij}^{[l]}$ represented by Equation 11 below are filter coefficients (coefficient vectors):

[Mathematical 11]

$$h_{*ij}^{[l]} = (h_{*ij}^{[l]}[0], h_{*ij}^{[l]}[1], \ldots, h_{*ij}^{[l]}[M^{[l]}-1])^T \quad (11)$$

The output sample is represented by Equation 12 below.

[Mathematical 12]

$$u_i^{[l]}[k] = \sum_{j=1}^{2} h_{ij}^{[l]\dagger} \overline{u}_j^{[l-1]}[k] + \sum_{j=1}^{2} h_{*ij}^{[l]\dagger} \overline{u}_j^{[l-1]*}[k] \quad (12)$$

When $H_{*ij}^{[l]}$ is set to Equation 13 below as described above,

[Mathematical 13]

$$H_{*ij}^{[l]} = \begin{pmatrix} h_{*ij}^{[l]}[0] & h_{*ij}^{[l]}[1] & \cdots & h_{*ij}^{[l]}[M^{[l]}-1] & 0 & \cdots & 0 \\ 0 & \ddots & \ddots & & \ddots & \ddots & \vdots \\ \vdots & & & & & & 0 \\ 0 & \cdots & 0 & h_{*ij}^{[l]}[0] & h_{*ij}^{[l]}[1] & \cdots & h_{*ij}^{[l]}[M^{[l]}-1] \end{pmatrix} \quad (13)$$

Equation 12 can be modified into Equation 14 below.

[Mathematical 14]

$$u_i^{[l]}[k] = \sum_{j=1}^{2} H_{ij}^{[l]*} u_j^{[l-1]}[k] + \sum_{j=1}^{2} H_{*ij}^{[l]*} u_j^{[l-1]*}[k] \quad (14)$$

$$= \sum_{j=1}^{2} U_j^{[l-1]}[k] h_{ij}^{[l]*} + \sum_{j=1}^{2} U_j^{[l-1]*}[k] h_{*ij}^{[l]*}$$

The input (input vector) of the filter of the first stage (l=1) is as follows.

[Mathematical 15]

$$x_i[k] = u_i^{[0]}[k] \quad (15)$$

It is assumed that in the filter output of the L-th stage that is the final stage, $M_{out}[L]=1$ and Equation 16 below.

[Mathematical 16]

$$y_i[k] = u_i^{[L]}[k] \quad (16)$$

$y_i[k]$ is calculated from $x_i[k]$ by using the above equation. A loss function φ is constructed from the filter output of the final stage, i.e., $y_i[k]$. The loss function can be constructed by using a method such as CMA or DDLMS. For example, when CMA is used for generating the loss function, a magnitude of an error between the filter output and a desired value r of the amplitude thereof, which is represented by Equation 17 below, is used as the loss function.

[Mathematical 17]

$$\phi[k] = \sum_{i=1}^{2} (r^2 - |y_i[k]|^2)^2 \quad (17)$$

Each filter coefficient is updated by using a stochastic gradient descent method in such a way as to minimize the loss function.

In the present example embodiment, the filter coefficient takes a complex value. Therefore, it is preferable to consider a method of differentiation of Wirtinger. In order to update a filter coefficient ξ* in such a way as to minimize the loss-function φ, it may be as follows.

[Mathematical 18]

$$\xi^* \rightarrow \xi^* - 2\alpha \frac{\partial \phi}{\partial \xi} \quad (18)$$

In Equation 18 above, a is a step size that controls a magnitude of the update. A multi-layer filter connected in tandem, which is considered in the present example embodiment, has a configuration in which the whole filter can be differentiated as in the above-described equation. Therefore, the gradient for each filter coefficient can be calculated by using the error back propagation method, and thus the filter coefficient can be updated by an efficient gradient descent method.

By a Wirtinger differential method, a complex variable z and its complex conjugate z* are calculated as being treated as independent. For the output of the filter final stage, when the aforementioned CMA loss function is used, then the gradient is given by Equations 19 to 21 below.

[Mathematical 19]

$$\frac{\partial \phi}{\partial y_i[k]} = -2e_i y_i^*[k] \quad (19)$$

[Mathematical 20]

$$\frac{\partial \phi}{\partial y_i^*[k]} = -2e_i y_i[k] \quad (20)$$

[Mathematical 21]

$$e_i = r^2 - |y_i[k]|^2 \quad (21)$$

This is the gradient for the filter output at the L-th stage being the final stage of the loss function.

By using error back propagation, from the gradient of the loss function for the filter output of the l-th stage, the filter coefficient of the l-th stage of the loss function and the gradient for the filter input can be calculated as follows. In a case where the filter of the l-th stage is an SL MIMO filter, a derivative be calculated by Equations 22 to 24 below.

[Mathematical 22]

$$\frac{\partial \phi}{\partial h_{ij}^{[l]}} = U_j^{[l-1]\dagger}[k] \frac{\partial \phi}{\partial u_i^{[l]*}[k]} \quad (22)$$

[Mathematical 23]

$$\frac{\partial \phi}{\partial u_j^{[l-1]*}[k]} = \sum_{i=1}^{2} H_{ij}^{[l]\dagger} \frac{\partial \phi}{\partial u_i^{[l]}[k]} \quad (23)$$

[Mathematical 24]

$$\frac{\partial \phi}{\partial u_j^{[l-1]*}[k]} = \sum_{i=1}^{2} H_{ij}^{[l]T} \frac{\partial \phi}{\partial u_i^{[l]*}[k]} \quad (24)$$

When the filter of the l-th stage is a WL MIMO filter, the derivative can be calculated by Equations 25 to 28 below.

[Mathematical 25]

$$\frac{\partial \phi}{\partial h_{ij}^{[l]}} = U_j^{[l-1]\dagger}[k] \frac{\partial \phi}{\partial u_i^{[l]*}[k]} \quad (25)$$

[Mathematical 26]

$$\frac{\partial \phi}{\partial h_{*ij}^{[l]}} = U_j^{[l-1]T}[k] \frac{\partial \phi}{\partial u_i^{[l]*}[k]} \quad (26)$$

[Mathematical 27]

$$\frac{\partial \phi}{\partial u_j^{[l-1]}[k]} = \sum_{i=1}^{2} \left( H_{ij}^{[l]\dagger} \frac{\partial \phi}{\partial u_i^{[l]}[k]} + H_{*ij}^{[l]T} \frac{\partial \phi}{\partial u_i^{[l]*}[k]} \right) \quad (27)$$

[Mathematical 28]

$$\frac{\partial \phi}{\partial u_j^{[l-1]*}[k]} = \sum_{i=1}^{2} \left( H_{*ij}^{[l]\dagger} \frac{\partial \phi}{\partial u_i^{[l]}[k]} + H_{ij}^{[l]T} \frac{\partial \phi}{\partial u_i^{[l]*}[k]} \right) \quad (28)$$

By using the above equations, from the gradient of the loss function with respect to the output of the filter in the l-th stage, the filter coefficient of the l-th stage of the loss function and the gradient of the loss function with respect to the filter input is calculated by error back propagation. When the filter coefficient of the l-th stage is adaptively controlled, the coefficient is updated according to Equation 18. When the filter coefficient of the l-th stage is handled in a fixed manner, the gradient with respect to the filter input may be calculated in the l-th stage filter. By repeating such processing from the L-th stage being the final stage, the gradient of the loss function is calculated for all the coefficients up to a filter of a 1st stage which is the first stage, and an update amount of the filter coefficient is calculated.

Figure 5:
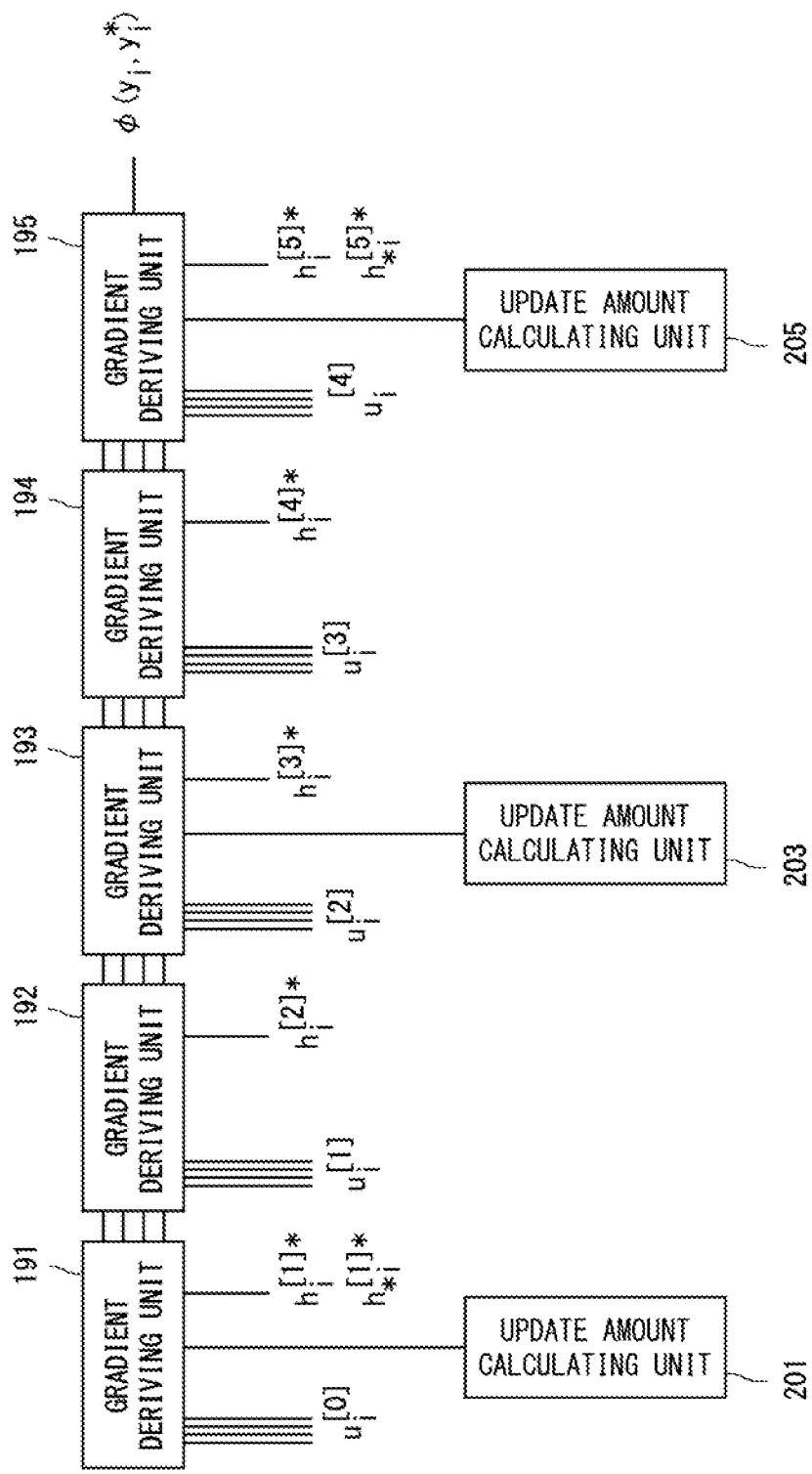
FIG. 5 is a block diagram illustrating calculation of a coefficient update amount of filter coefficients in a multi-layer filter configuration.

FIG. 5 illustrates calculation of a coefficient update amount of the filter coefficient in a multilayer filter configuration. The coefficient updating unit 177 includes gradient deriving units 191 to 195 and coefficient update amount calculating units 201, 203, and 205. The gradient deriving unit 191 is arranged in response to the in-receiver distortion compensating filter 171 (see FIG. 4) that is the 1st-stage filter. The gradient deriving unit 192 is arranged in response to the wavelength dispersion compensating filter 172 that is a second stage filter. The gradient deriving unit 193 is arranged in response to the polarization fluctuation compensating filter 173 that is a third-stage filter. The gradient deriving unit 194 is arranged in response to the carrier phase compensating filter 174 that is a fourth-stage filter. The gradient deriving unit 195 is arranged in response to the in-transmitter distortion compensating filter 175 that is a fifth-stage filter.

The gradient deriving unit 195 calculates a gradient with respect to the output of the in-transmitter distortion compensating filter 175, which is a filter of the fifth stage of the loss function $\varphi$ ($y_i$, $y_i^*$). The gradient deriving unit 195 calculates a gradient of the loss function with respect to $u_i^{[4]}$, which is an input of the in-transmitter distortion compensating filter 175, from the calculated gradient with respect to the output of the loss function. In addition, the gradient deriving unit 195 calculates a gradient of the loss function with respect to filter coefficients $h_i^{[5]*}, h_{*i}^{[5]*}$ of the in-transmitter distortion compensating filter 175, from the gradient with respect to the output of the loss function. The coefficient update amount calculating unit 205 calculates an update amount of the filter coefficient of the in-transmitter distortion compensating filter 175, based on the gradient with respect to the filter coefficient of the loss function.

The gradient deriving unit 194 acquires, from the gradient deriving unit 195, a gradient with respect to the input $u_i^{[4]}$ of the fifth-stage filter of the loss function, which is calculated by the gradient deriving unit 195. The input $u_i^{[4]}$ of the fifth-stage filter is equal to the output $u_i^{[4]}$ of the carrier phase compensating filter 174, which is the fourth-stage filter. The gradient deriving unit 194 calculates a gradient with respect to an input $u_i^{[3]}$ of the carrier phase compensating filter 174, which is the fourth-stage filter, from the gradient with respect to the output $u_i^{[4]}$ of the loss function.

The gradient deriving unit 193 acquires, from the gradient deriving unit 194, a gradient with respect to the input $u_i^{[3]}$ of the fourth-stage filter of the loss function, which is calculated by the gradient deriving unit 194. The input $u_i^{[3]}$ of the fourth-stage filter is equal to an output $u_i^{[3]}$ of the polarization fluctuation compensating filter 173, which is the third-stage filter. The gradient deriving unit 193 calculates a gradient with respect to an input $u_i^{[2]}$ of the carrier phase compensating filter 174, which is the third-stage filter, from the gradient with respect to the output $u_i^{[3]}$ of the loss function. Further, the gradient deriving unit 193 calculates a gradient of the loss function with respect to a filter coefficient $h_{ij}^{[3]*}$ of the polarization fluctuation compensating filter 173, from the gradient with respect to the output of the loss function. The coefficient update amount calculating unit 203 calculates the update amount of the filter coefficient of the polarization fluctuation compensating filter 173, based on the gradient with respect to the filter coefficient of the loss function.

The gradient deriving unit 192 acquires, from the gradient deriving unit 193, a gradient with respect to the input $u_i^{[2]}$ of the third-stage filter of the loss function, which is calculated by the gradient deriving unit 193. The input $u_i^{[2]}$ of the third-stage filter is equal to an output $u_i^{[2]}$ of the wavelength dispersion compensating filter 172, which is the second-stage filter. The gradient deriving unit 192 calculates a gradient with respect to an input $u_i^{[1]}$ of the wavelength dispersion compensating filter 172, which is the second-stage filter, from the gradient with respect to the output $u_i^{[2]}$ of the loss function.

The gradient deriving unit 191 acquires, from the gradient deriving unit 192, the gradient with respect to the input $u_i^{[1]}$ of the second-stage filter of the loss function, which is calculated by the gradient deriving unit 192. The input $u_i^{[1]}$ of the second-stage filter is equal to an output $u_i^{[1]}$ of the in-receiver distortion compensating filter 171, which is the first-stage filter. The gradient deriving unit 191 calculates a gradient with respect to an input $u_i^{[0]}$ of the in-receiver distortion compensating filter 171, which is the first-stage filter, from the gradient with respect to the output $u_i^{[1]}$ of the loss function. Further, the gradient deriving unit 191 calculates a gradient of the loss function with respect to the filter coefficients $h_i^{[1]*}, h_{*i}^{[1]*}$ of the in-receiver distortion compensating filter 171, from the gradient with respect to the output $u_i^{[1]}$ of the loss function. The coefficient update amount calculating unit 201 calculates the update amount of the filter coefficient of the in-receiver distortion compensating filter 171, based on the gradient with respect to the filter coefficient of the loss function.

Note that the filter coefficient of the wavelength dispersion compensating filter 172, which is the second-stage filter, is determined from an accumulated wavelength dispersion amount D to be compensated, by using Equation 29 below.

[Mathematical 29]

$$H_{CD}(\omega) = \exp\left(i\frac{\lambda^2}{4\pi c}D\omega^2\right) \quad (29)$$

In Equation 29 above, $\lambda$ indicates a wavelength of the optical signal, and c indicates a speed of light. As for the carrier phase compensating filter 174 that is the fourth-stage filter, the coefficient is determined by using Equation 30 below.

[Mathematical 30]

$$h_{CPEi} = \exp(-i\theta_i[k]) \quad (30)$$

In Equation 30, $\theta_i[k]$ is determined based on the filter output of the final stage, as described above.

As described above, the adaptively controlled coefficients of the in-receiver distortion compensating filter 171, the polarization fluctuation compensating filter 173, and the in-transmitter distortion compensating filter 175 can be updated in such a way as to bring the output of the filter of the final stage close to a desired state. Adaptive control of these filters based on the output of the filter of the final stage is described in "Adaptive equalization of transmitter and receiver IQ skew by multi-layer linear and widely linear filters with deep unfolding (Vol. 28, No. 16/3 Aug. 2020/ Optics Express 23478)".

The first WL filter 161 after convergence of the adaptive control of the coefficients (see FIG. 3, associated to the in-receiver distortion compensating filter 171 in FIG. 4) includes information on distortion in a receiver. The second WL filter 163 after convergence of the adaptive control of the coefficients (associated to the in-transmitter distortion compensating filter 175 in FIG. 4) includes information on distortion in a transmitter. In a sense, the coefficients of these filters ideally indicate an inverse response of distortion.

In the following, for the sake of simplicity of explanation, an example will be explained in which information on distortion is extracted from filter coefficients with respect to IQ imbalance, IQ skew, and IQ phase shift occurring in each of the transmitter and the receiver. It is assumed that the IQ imbalance, the IQ skew, and the IQ phase shift do not have frequency dependency.

First, consider a WL 2×1 filter with a complex signal for each polarization and its complex conjugate as inputs. Let $x(t)$ be a complex signal to be input, $y(t)$ be an output, and $h(t)$ and $h^*(t)$ be an impulse response of the WL 2×1 filter. An input-output relationship of the filter is represented by Equation 31 below.

[Mathematical 31]

$$y(t) = (h(t) \ h_*(t))^* \star \begin{pmatrix} x(t) \\ x^*(t) \end{pmatrix} \quad (31)$$

Herein, "$\star$" represents a convolutional integral.

On the other hand, the input-output relationship in the real signal input real coefficient 2×2 filter with the IQ component as an input, which is equivalent to the WL 2×1 filter, is represented by Equation 32 below.

[Mathematical 32]

$$\begin{pmatrix} y_I(t) \\ y_Q(t) \end{pmatrix} = \begin{pmatrix} h_{II}(t) & h_{IQ}(t) \\ h_{QI}(t) & h_{QQ}(t) \end{pmatrix} \star \begin{pmatrix} x_I(t) \\ x_Q(t) \end{pmatrix} \quad (32)$$

Herein, for example, it is Equation 33 below.

[Mathematical 33]

$$y(t) = y_I(t) + iy_Q(t) \quad (33)$$

In the frequency domain, it becomes Equation 34 below.

[Mathematical 34]

$$\begin{pmatrix} Y_I(\omega) \\ Y_Q(\omega) \end{pmatrix} = \begin{pmatrix} H_{II}(\omega) & H_{IQ}(\omega) \\ H_{QI}(\omega) & H_{QQ}(\omega) \end{pmatrix} \begin{pmatrix} X_I(\omega) \\ X_Q(\omega) \end{pmatrix} \quad (34)$$

In order to consider the IQ imbalance, the IQ skew, and the IQ phase shift, which are the main distortions occurring in the transmitter and receiver, it is preferable to consider a display (IQ display) in which the IQ component appears explicitly. As described in Non Patent Literature 3, the two relationships are represented by Equation 35 below.

[Mathematical 35]

$$\begin{pmatrix} h^*(t) & h_*^*(t) \\ h(t) & h_*(t) \end{pmatrix} = \frac{1}{2} T \begin{pmatrix} h_{II}(t) & h_{IQ}(t) \\ h_{QI}(t) & h_{QQ}(t) \end{pmatrix} T^\dagger \quad (35)$$

Herein, it is Equation 36 below,

[Mathematical 36]

$$T^\dagger T = TT^\dagger = 2I \quad (36)$$

$I$ is an identity matrix.

Consider then a model of distortions in the transmitter and receiver. A frequency response of the IQ imbalance can be modeled by Equation 37 below, where a is an index representing the imbalance.

[Mathematical 37]

$$H_{IQimb}(\omega) = \begin{pmatrix} (1+a) & 0 \\ 0 & (1+a)^{-1} \end{pmatrix} \quad (37)$$

Similarly, a frequency response of the IQ skew can be modeled by Equation 38 below, where $\tau$ is an amount of skew.

[Mathematical 38]

$$H_{IQskew}(\omega) = \begin{pmatrix} \exp(+i\omega\tau) & 0 \\ 0 & \exp(-i\omega\tau) \end{pmatrix} \quad (38)$$

A frequency response of the IQ phase shift can be modeled by Equation 39 below, where $\varphi$ is a phase shift from a quadrature between the IQ components and $\theta$ is an arbitrary phase rotation.

[Mathematical 39]

$$H_{IQphase}(\omega) = \begin{pmatrix} \cos(\varphi/2 + \theta) & \sin(\varphi/2 - \theta) \\ \sin(\varphi/2 + \theta) & \cos(\varphi/2 - \theta) \end{pmatrix} \quad (39)$$

As can be seen from Equations 37 to 39, $H_{IQimb}$ and $H_{IQskew}$ are interchangeable, but they are not interchangeable with $H_{IQphase}$. In a coherent optical communication system, IQ phase shift occurs in the transmitter after IQ imbalance and IQ skew. Thus, the distortion occurring in the transmitter is as follows.

[Mathematical 40]

$$H_{Tx(\omega)} = H_{IQphase}(\omega)H_{IQskew}(\omega)H_{IQimb}(\omega) \quad (40)$$

$$= \begin{pmatrix} \cos(\varphi/2 + \theta)(1+a)\exp(+i\omega\tau/2) & \sin(\varphi/2 - \theta)(1+a)^{-1}\exp(-i\omega\tau/2) \\ \sin(\varphi/2 + \theta)(1+a)\exp(+i\omega\tau/2) & \cos(\varphi/2 - \theta)(1+a)^{-1}\exp(-i\omega\tau/2) \end{pmatrix} \quad (41)$$

On the other hand, in the receiver, IQ imbalance and IQ skew occur after IQ phase shift. Thus, the distortion occurring in the receiver is as follows.

[Mathematical 41]

$$H_{Rx(\omega)} = H_{IQphase}(\omega)H_{IQimb}(\omega)H_{IQskew}(\omega) \quad (42)$$

$$= \begin{pmatrix} \cos(\varphi/2+\theta)(1+a)\exp(+i\omega\tau/2) & \sin(\varphi/2-\theta)(1+a)\exp(+i\omega\tau/2) \\ \sin(\varphi/2+\theta)(1+a)^{-1}\exp(-i\omega\tau/2) & \cos(\varphi/2-\theta)(1+a)^{-1}\exp(-i\omega\tau/2) \end{pmatrix} \quad (43)$$

In this way, the distortions in the transmitter and the receiver are different in the order of the IQ imbalance, the IQ skew, and the IQ phase shift, and in consideration of this, each distortion model is acquired.

As described above, ideally, the coefficient after convergence of the adaptive filter is an inverse response of the distortion. Thus, when the adaptive filter converges properly, the response in the IQ display of the in-receiver distortion compensating filter 171 is expected to be as follows.

[Mathematical 42]

$$H^{[1]}(\omega) = H_{Rx}^{-1}(\omega) \quad (44)$$

$$= c\begin{pmatrix} \cos(\varphi/2-\theta)(1+a)^{-1}\exp(-i\omega\tau/2) & -\sin(\varphi/2-\theta)(1+a)\exp(+i\omega\tau/2) \\ -\sin(\varphi/2+\theta)(1+a)^{1}\exp(-i\omega\tau/2) & \cos(\varphi/2+\theta)(1+a)\exp(+i\omega\tau/2) \end{pmatrix} \quad (45)$$

The response of the in-transmitter distortion compensating filter 175 in the IQ display is expected to be as follows.

[Mathematical 43]

$$H^{[5]}(\omega) = H_{Tx}^{-1}(\omega) \quad (46)$$

$$= c\begin{pmatrix} \cos(\varphi/2-\theta)(1+a)^{-1}\exp(-i\omega\tau/2) & -\sin(\varphi/2-\theta)(1+a)^{-1}\exp(-i\omega\tau/2) \\ -\sin(\varphi/2+\theta)(1+a)\exp(+i\omega\tau/2) & \cos(\varphi/2+\theta)(1+a)\exp(+i\omega\tau/2) \end{pmatrix} \quad (47)$$

Herein, c represents some constant.

In the above case, the imbalance index a, the IQ skew amount $\tau$, and the IQ phase shift $\varphi$ can be calculated from a frequency 0 component and a predetermined certain frequency $\Delta\omega$ component as follows. It is assumed that an II component, an IQ component, a QI component, and a QQ component of the frequency response of the in-receiver distortion compensating filter 171 in the IQ display are $H_{II}^{[1]}(\omega)$, $H_{IQ}^{[1]}(\omega)$, $H_{QI}^{[1]}(\omega)$, and $H_{QQ}^{[1]}(\omega)$, respectively. For in-receiver distortion, the IQ imbalance index a can be calculated by Equation 48 below.

[Mathematical 44]

$$a = \left(\frac{|H_{IQ}^{[1]}(0)|^2 + |H_{QQ}^{[1]}(0)|^2}{|H_{II}^{[1]}(0)|^2 + |H_{QI}^{[1]}(0)|^2}\right)^{\frac{1}{4}} - 1 \quad (48)$$

The IQ skew amount $\tau$ can be calculated by Equation 49 below.

[Mathematical 45]

$$\tau = \frac{\arg(H_{QQ}^{[1]}(\Delta\omega)) - \arg(H_{II}^{[1]}(\Delta\omega))}{\Delta\omega} \quad (49)$$

The IQ phase shift $\varphi$ can be calculated by Equation 50 below.

[Mathematical 46]

$$\varphi = \cos^{-1}\left(\frac{|H^{[1]}(0)|}{(|H_{II}^{[1]}(0)|^2 + |H_{QI}^{[1]}(0)|^2)(|H_{IQ}^{[1]}(0)|^2 + |H_{QQ}^{[1]}(0)|^2)}\right) \quad (50)$$

Similarly, for in-transmitter distortion, the IQ imbalance index a can be calculated by Equation 51 below.

[Mathematical 47]

$$\alpha = \left(\frac{|H_{QI}^{[5]}(0)| + |H_{QQ}^{[5]}(0)|}{|H_{II}^{[5]}(0)|^2 + |H_{IQ}^{[1]}(0)|^2}\right)^{\frac{1}{4}} - 1 \quad (51)$$

The IQ skew amount $\tau$ can be calculated by Equation 52 below.

[Mathematical 48]

$$\tau = \frac{\arg(H_{QQ}^{[5]}(\Delta\omega)) - \arg(H_{II}^{[5]}(\Delta\omega))}{\Delta\omega} \quad (52)$$

The IQ phase shift φ can be calculated by Equation 53 below.

[Mathematical 49]

$$\varphi = \cos^{-1}\left(\frac{|H^{[5]}(0)|}{(|H_{II}^{[5]}(0)|^2 + |H_{IQ}^{[5]}(0)|^2)(|H_{QI}^{[5]}(0)|^2 + |H_{QQ}^{[5]}(0)|^2)}\right) \quad (53)$$

Figure 6:
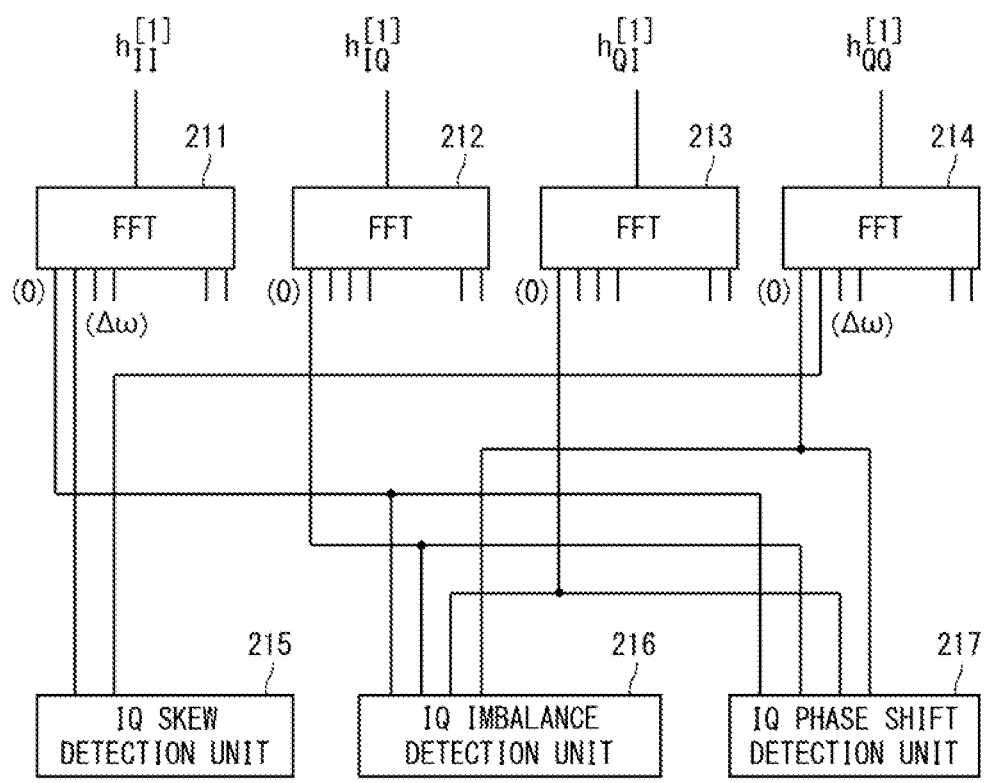
FIG. 6 is a block diagram illustrating a configuration example of an in-receiver distortion detection unit.

FIG. 6 illustrates a configuration example of an in-receiver distortion detection unit. The in-receiver distortion detection unit 178 (see FIG. 4) includes fast Fourier transform (FFT) units 211 to 214, an IQ skew detection unit 215, an IQ imbalance detection unit 216, and an IQ phase shift detection unit 217. The FFT unit 211 converts the II component $h_{II}^{[1]}$ of the coefficient of the in-receiver distortion compensating filter 171 into a signal $H_{II}^{[1]}$ in the frequency domain. The FFT unit 212 converts the IQ component $h_{IQ}^{[1]}$ of the coefficient of the in-receiver distortion compensating filter 171 into a frequency-domain signal $H_{IQ}^{[1]}$. The FFT unit 213 converts the QI component $h_{QI}^{[1]}$ of the coefficient of the in-receiver distortion compensating filter 171 into a signal $H_{QI}^{[1]}$ in the frequency domain. The FFT unit 214 converts the QQ component $h_{QQ}^{[1]}$ of the coefficient of the in-receiver distortion compensating filter 171 into a signal $H_{QQ}^{[1]}$ in the frequency domain.

A frequency 0 component $H_{II}^{[1]}(0)$ of the II component, a frequency 0 component $H_{IQ}^{[1]}(0)$ of the IQ component, a frequency 0 component $H_{QI}^{[1]}(0)$ of the QI component, and a frequency 0 component $H_{QQ}^{[1]}(0)$ of the QQ component are input to the IQ imbalance detection unit 216 from the FFT units 211 to 214. The IQ imbalance detection unit 216 calculates an index a indicating the IQ imbalance in the receiver by using Equation 48.

A predetermined frequency Δω component $H_{II}^{[1]}(\Delta\omega)$ of the II component is input from the FFT unit 211 to the IQ skew detection unit 215, and a frequency Δω component $H_{QQ}^{[1]}(\Delta\omega)$ of the QQ component is input from the FFT unit 214. The IQ skew detection unit 215 calculates the IQ skew t at the receiver by using Equation 49.

To the IQ phase shift detection unit 217, the frequency 0 component $H_{II}^{[1]}(0)$ of the II component, the frequency 0 component $H_{IQ}^{[1]}(0)$ of the IQ component, the frequency 0 component $H_{QI}^{[1]}(0)$ of the QI component, and the frequency 0 component $H_{QQ}^{[1]}(0)$ of the QQ component are input from the FFT units 211 to 214. The IQ phase shift detection unit 217 calculates the IQ phase shift φ in the receiver by using Equation 50.

Figure 7:
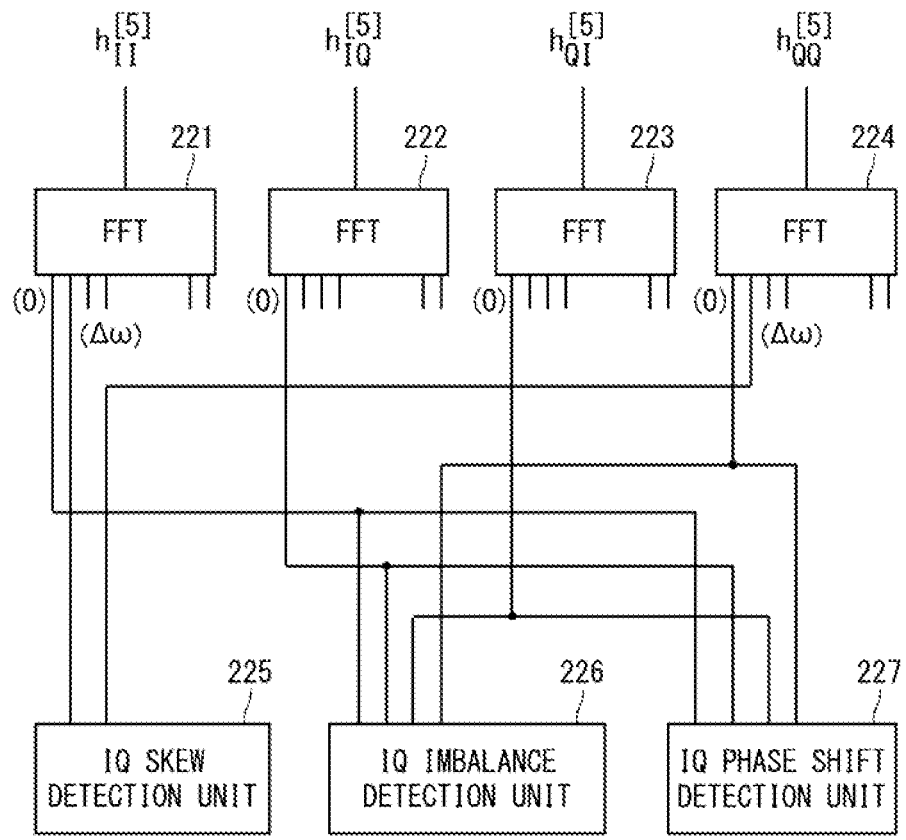
FIG. 7 is a block diagram illustrating a configuration example of an in-transmitter distortion detection unit.

FIG. 7 illustrates a configuration example of an in-transmitter distortion detection unit. The in-transmitter distortion detection unit 179 (see FIG. 4) includes FFT units 221 to 224, an IQ skew detection unit 225, an IQ imbalance detection unit 226, and an IQ phase shift detection unit 227. The FFT unit 221 converts an II component $h_{II}^{[5]}$ of the coefficient of the in-transmitter distortion compensating filter 175 into a signal $H_{II}^{[5]}$ in the frequency domain. The FFT unit 222 converts an IQ component $h_{IQ}^{[5]}$ of the coefficient of the in-transmitter distortion compensating filter 175 into a signal $H_{IQ}^{[5]}$ in the frequency domain. The FFT unit 223 converts a QI component $h_{QI}^{[5]}$ of the coefficient of the in-transmitter distortion compensating filter 175 into a signal $H_{QI}^{[5]}$ in the frequency domain. The FFT unit 224 converts a QQ component $h_{QQ}^{[5]}$ of the coefficient of the in-transmitter distortion compensating filter 175 into a signal $H_{QQ}^{[5]}$ in the frequency domain.

A frequency 0 component $H_{II}^{[5]}(0)$ of the II component, a frequency 0 component $H_{IQ}^{[5]}(0)$ of the IQ component, a frequency 0 component $H_{QI}^{[5]}(0)$ of the QI component, and a frequency 0 component $H_{QQ}^{[5]}(0)$ of the QQ component are input to the IQ imbalance detection unit 226 from the FFT units 221 to 224. The IQ imbalance detection unit 226 calculates an index a indicating the IQ imbalance in the transmitter by using Equation 51.

A predetermined frequency Δω component $H_{II}^{[5]}(\Delta\omega)$ of the II component is input from the FFT unit 221 to the IQ skew detection unit 225, and a frequency Δω component $H_{QQ}^{[5]}(\Delta\omega)$ of the QQ component is input from the FFT unit 224. The IQ skew detection unit 225 calculates the IQ skew t in the transmitter by using Equation 52.

The frequency 0 component $H_{II}^{[5]}(0)$ of the II component, the frequency 0 component $H_{IQ}^{[5]}(0)$ of the IQ component, the frequency 0 component $H_{QI}^{[5]}(0)$ of the QI component, and the frequency 0 component $H_{QQ}^{[5]}(0)$ of the QQ component are input to the IQ phase shift detection unit 227 from the FFT units 221 to 224. The IQ phase shift detection unit 227 calculates the IQ phase shift φ in the transmitter by using Equation 53.

As for the in-receiver distortion and the in-transmitter distortion, a calculation method for the IQ skew and the IQ imbalance detection is different between the in-receiver distortion detection unit 178 and the in-transmitter distortion detection unit 190. This is because the model differences between the distortions in the transmitter and receiver due to the order are reflected.

Figure 8:
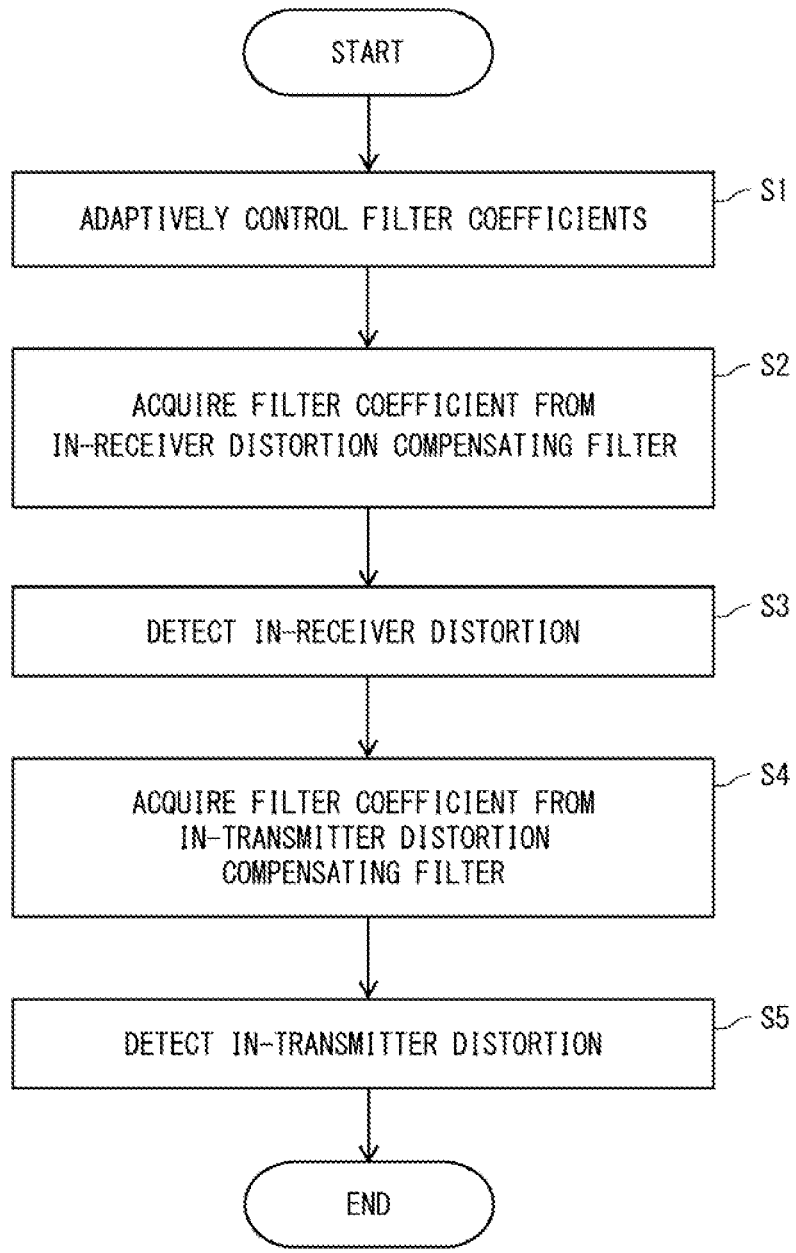
FIG. 8 is a flowchart illustrating an operation procedure of distortion compensation and distortion detection in an optical receiver.

Next, an operation procedure will be explained. FIG. 8 illustrates an operation procedure (a distortion detection method) of distortion compensation and distortion detection in an optical receiver. The coefficient updating unit 177 (see FIG. 4) adaptively controls the filter coefficient of the in-receiver distortion compensating filter 171, the polarization fluctuation compensating filter 173, and the in-transmitter distortion compensating filter 175 (step S1). In step S1, the coefficient updating unit 177 updates the filter coefficient by using a loss function calculated based on the output of the in-transmitter distortion compensating filter 175 that is the filter of the final stage.

After convergence of the adaptive control of the coefficients, the in-receiver distortion detection unit 178 acquires the filter coefficients from the in-receiver distortion compensating filter 171 (step S2). The in-receiver distortion detection unit 178 detects the in-receiver distortion, based on the acquired filter coefficient (step S3). In step S3, the in-receiver distortion detection unit 178 detects, for example, at least one of IQ skew, IQ imbalance, and IQ phase shift. The in-receiver distortion detection unit 178 converts, for example, the filter coefficient into a signal in the frequency domain, and detects at least one of IQ skew, IQ imbalance, and IQ phase shift by using the converted signal in the frequency domain.

After convergence of the adaptive control of the coefficients, the in-transmitter distortion detection unit 179 acquires the filter coefficient from the in-transmitter distortion compensating filter 175 (step S4). The in-transmitter distortion detection unit 179 detects the in-transmitter distortion, based on the acquired filter coefficient (step S5). In step S5, the in-transmitter distortion detection unit 79 detects, for example, at least one of IQ skew, IQ imbalance, and IQ phase shift. The in-transmitter distortion detection unit 179 converts, for example, a filter coefficient into a signal in the frequency domain, and detects at least one of IQ skew, IQ imbalance, and IQ phase shift by using the signal in the frequency domain. The steps S2 and S3 and steps S4 and S5 can be performed in parallel.

In the present example embodiment, the first WL filter 161 (see FIG. 3) is arranged in the first stage of the plurality of filters connected in tandem with respect to the received signal, and the second WL filter 163 is arranged in the final stage. The coefficient of the first WL filter 161 and the coefficient of the second WL filter 163 are adaptively controlled based on the output of the second WL filter 163 of the final stage. When the adaptive control of the coefficients converges, the first WL filter 161 functions as a filter to compensate for in-receiver distortion, and the second WL filter 163 functions as a filter to compensate for in-transmitter distortion. The in-receiver distortion detection unit 166 detects the IQ skew, the IQ imbalance, and the IQ phase shift occurring in the receiver from the coefficient of the first WL filter 161. The in-transmitter distortion detection unit 167 detects IQ skew, IQ imbalance, and IQ phase shift occurring in the transmitter from the coefficient of the second WL filter. In this way, the distortion estimation unit 156 in the optical receiver 150 (see FIG. 2) can detect the in-transmitter distortion and the in-receiver distortion by separating each of them at the same time, from the filter coefficient after the convergence of the adaptive control of the coefficients.

The present inventor has conducted simulations to verify the effects of in-receiver distortion detection and in-transmitter distortion detection. In the simulations, a model is used in which a 32 Gbaud polarization multiplexed Quadrature Phase-Shift Keying (QPSK) signal is subjected to wavelength dispersion and polarization-state rotation equivalent to 100 km single-mode fiber propagation, and then the resultant signal is coherently received. In addition, in the transmitter and the receiver, digital signal processing has been performed in which random IQ imbalance, IQ skew, and IQ phase shift (no frequency dependency) according to a normal distribution are simultaneously applied, and the above-described demodulation and distortion detection are performed.

Figure 9A:
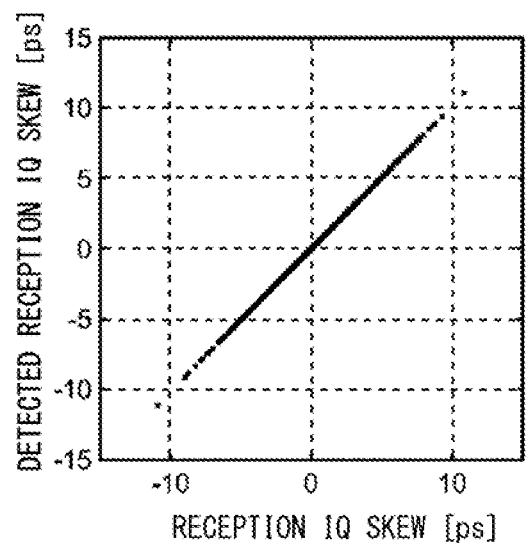
FIG. 9A is a graph illustrating simulation results for in-receiver distortion.
Figure 9B:
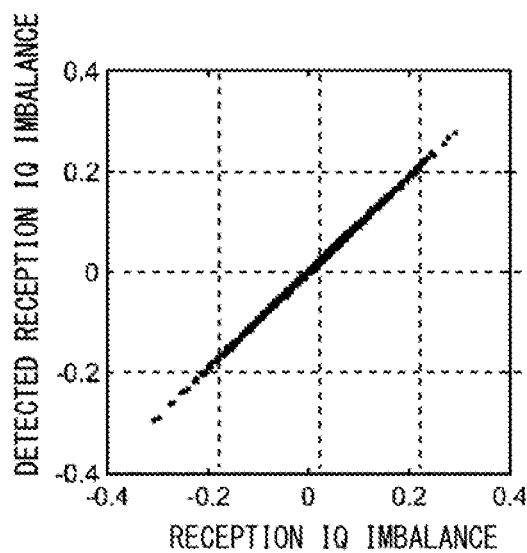
FIG. 9B is a graph illustrating simulation results for in-receiver distortion.
Figure 9C:
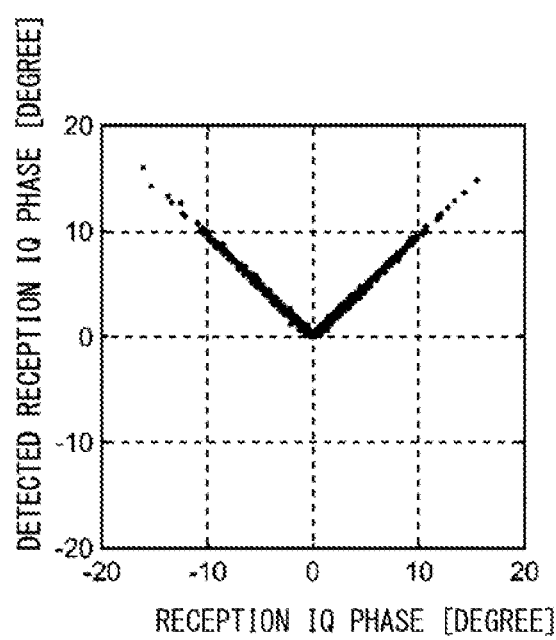
FIG. 9C is a graph illustrating simulation results for in-receiver distortion.

FIGS. 9A to 9C illustrate simulation results for in-receiver distortion. In FIG. 9A, the horizontal axis represents an IQ skew (picoseconds) imparted in the receiver in the simulation, and the vertical axis represents an IQ skew detected from the in-receiver distortion compensating filter 171. Plotting a relationship between the IQ skew imparted in the receiver and the detected IQ skew for the X polarization signal has yielded a graph illustrated in FIG. 9A.

In FIG. 9B, the horizontal axis represents an IQ imbalance (an index thereof) imparted in the receiver in the simulation, and the vertical axis represents an IQ imbalance detected from the in-receiver distortion compensating filter 171. Plotting a relationship between the IQ imbalance imparted in the receiver and the detected IQ imbalance for the X polarization signal has yielded a graph illustrated in FIG. 9B.

In FIG. 9C, the horizontal axis represents an IQ phase shift (degrees) imparted in the receiver in the simulation, and the vertical axis represents an IQ phase shift detected from the in-receiver distortion compensating filter 171. Plotting a relationship between the IQ phase shift imparted in the receiver and the detected IQ phase shift for the X polarization signal has yielded a graph illustrated in FIG. 9C.

Figure 10A:
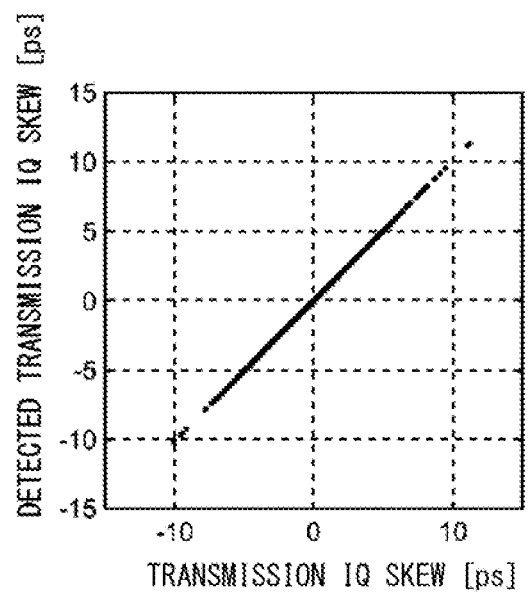
FIG. 10A is a graph illustrating simulation results for in-transmitter distortion.
Figure 10B:
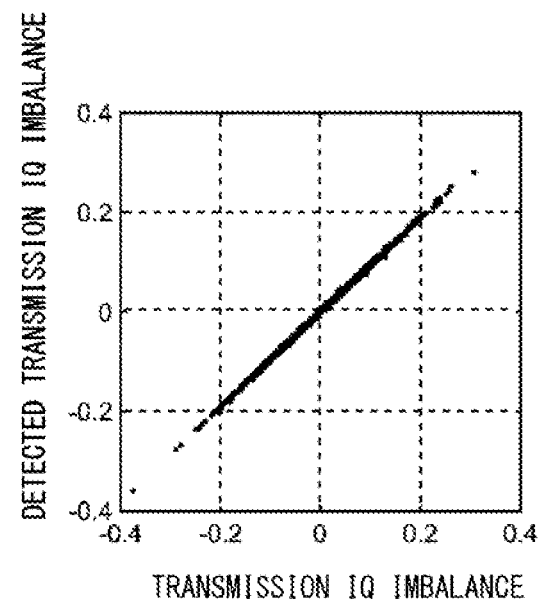
FIG. 10B is a graph illustrating simulation results for in-transmitter distortion.
Figure 10C:
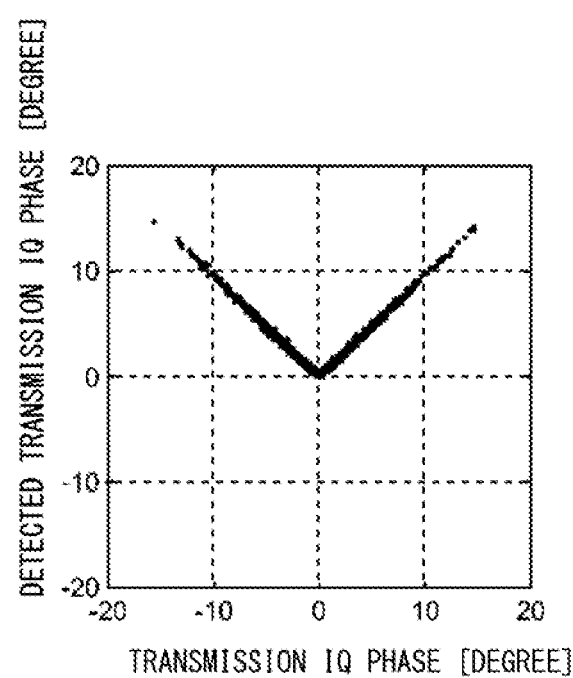
FIG. 10C is a graph illustrating simulation results for in-transmitter distortion.

FIGS. 10A to 10C illustrate simulation results for in-transmitter distortion. In FIG. 10A, the horizontal axis represents an IQ skew (picoseconds) imparted in the transmitter in the simulation and the vertical axis represents an IQ skew detected from the in-transmitter distortion compensating filter 175. Plotting a relationship between the IQ skew imparted in the transmitter and the detected IQ skew for the X polarization signal has yielded a graph illustrated in FIG. 10A.

In FIG. 10B, the horizontal axis represents an IQ imbalance (an index thereof) imparted in the transmitter in the simulation, and the vertical axis represents an IQ imbalance detected from the in-transmitter distortion compensating filter 175. Plotting a relationship between the IQ imbalance imparted in the transmitter and the detected IQ imbalance for the X polarization signal has yielded a graph illustrated in FIG. 10B.

In FIG. 10C, the horizontal axis represents an IQ phase shift (degrees) imparted in the transmitter in the simulation, and the vertical axis represents an IQ phase shift detected from the in-transmitter distortion compensating filter 175. Plotting a relationship between the IQ phase shift imparted in the transmitter and the detected IQ phase shift for the X polarization signal has yielded a graph illustrated in FIG. 10C.

With reference to FIGS. 9A and 10A, it can be seen that for the IQ skew, the IQ skew imparted in the transmitter and in the receiver is approximately the same as the IQ skew detected in each of the transmitter and receiver. With reference also to FIGS. 9B and 10B, it can be seen that for the IQ imbalance, the IQ imbalance imparted in the transmitter and in the receiver is approximately the same as the IQ imbalance detected in each of the transmitter and receiver. As simulation results, it can be confirmed that the IQ skew and the IQ imbalance in the receiver and the IQ skew and the IQ imbalance in the transmitter can be each detected separately at the same time.

As illustrated in FIGS. 9C and 10C, the IQ phase shift cannot be detected from the symmetry of the cosine function appearing at the time of calculation for signs of the imparted phases. However, it was able to confirm that absolute values of the phases imparted in the transmitter and in the receiver have been properly detected. As simulation results, it was able to confirm that the IQ phase shift in the receiver and the IQ phase shift in the transmitter can be each detected separately at the same time. As described above, in the present example embodiment, it is possible to detect the in-receiver distortion and the in-transmitter distortion separately without preparing the transmitter or the receiver that has been calibrated in advance with high accuracy.

In the distortion detection according to the above example embodiment, it is assumed that in the adaptive multilayer filter, the in-receiver distortion and the in-transmitter distortion are compensated by using different filters. The wavelength dispersion and existence of frequency offset and its non-commutativity with in-transceiver distortion helps this assumption, but does not fully ensure that a plurality of filters do not cooperate to address one distortion. However, the separation can be advanced by the following contrivance.

In an adaptive multilayer filter, it is also possible to set an individual value for the step size of the coefficient update of each filter. Consider that the skew in the transceiver does not change significantly during operation even when adaptive control is required. From this, it is considered appropriate that the step size used for updating the coefficients of the in-receiver distortion compensating filter and the in-transmitter distortion compensating filter is set to a value smaller than the step size used for updating the coefficient of the polarization fluctuation compensating filter. Alternatively, the polarization fluctuation compensating filter may be adaptively controlled first, and then the in-receiver distortion compensating filter and the in-transmitter distortion compensating filter may be adaptively controlled sequentially. In this case, a cooperative operation of the plurality of filters is suppressed, and the in-receiver distortion compensation and the in-transmitter distortion compensation can be separated.

In the above example embodiment, an example in which it is assumed that the filter in the digital signal processing illustrated in FIG. 3 or FIG. 4 is implemented in the demodulation unit 154 has been explained. However, the present disclosure is not limited thereto. As a modified example, some or all of the digital signal processing illustrated in FIG. 3 or FIG. 4 may be implemented in hardware different from the demodulation unit 154.

Figure 11:
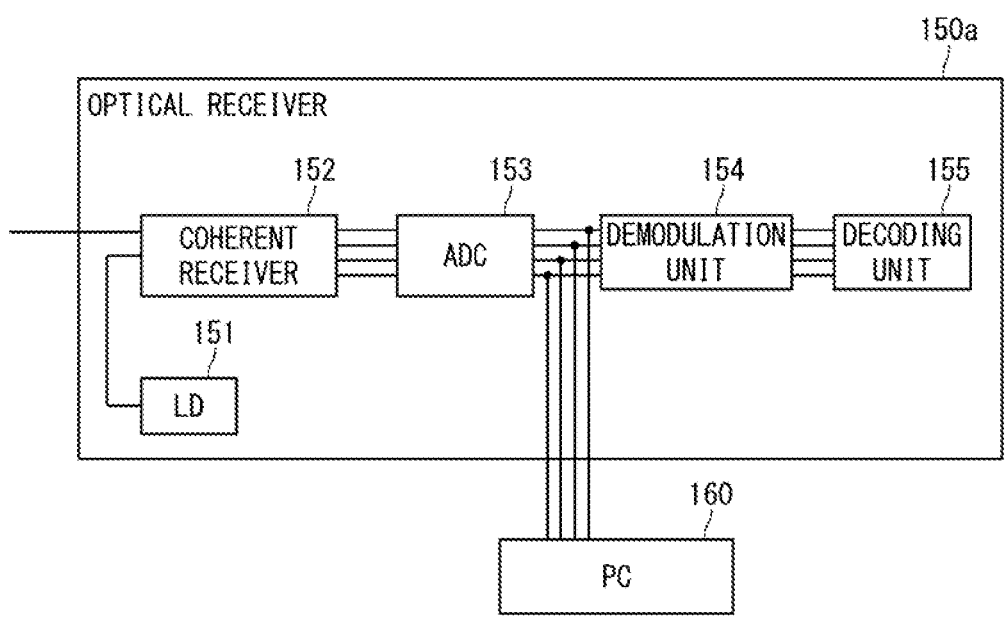
FIG. 11 is a block diagram illustrating an optical receiver used in a modified example.

FIG. 11 illustrates an optical receiver used in the modified example. An optical receiver 150a is different from the optical receiver 150 illustrated in FIG. 2 in that the optical receiver 150a does not include the distortion estimation unit 156. A PC 160 having the function of the distortion estimation unit 156 is connected to the optical receiver 150a. Four sequences of received signals to be output from the ADC 153 are branched to the PC 160. The PC 160 performs the digital signal processing illustrated in FIG. 3 or FIG. 4. Among the digital signal processing illustrated in FIG. 3 or FIG. 4, functions other than the in-receiver distortion detection unit and the in-transmitter distortion detection unit may be implemented by dedicated hardware. In the modified example, even when the optical receiver 150a that does not have the functions of in-receiver distortion compensation and in-transmitter distortion compensation is used, in-receiver distortion and in-transmitter distortion can be detected.

Figure 18:
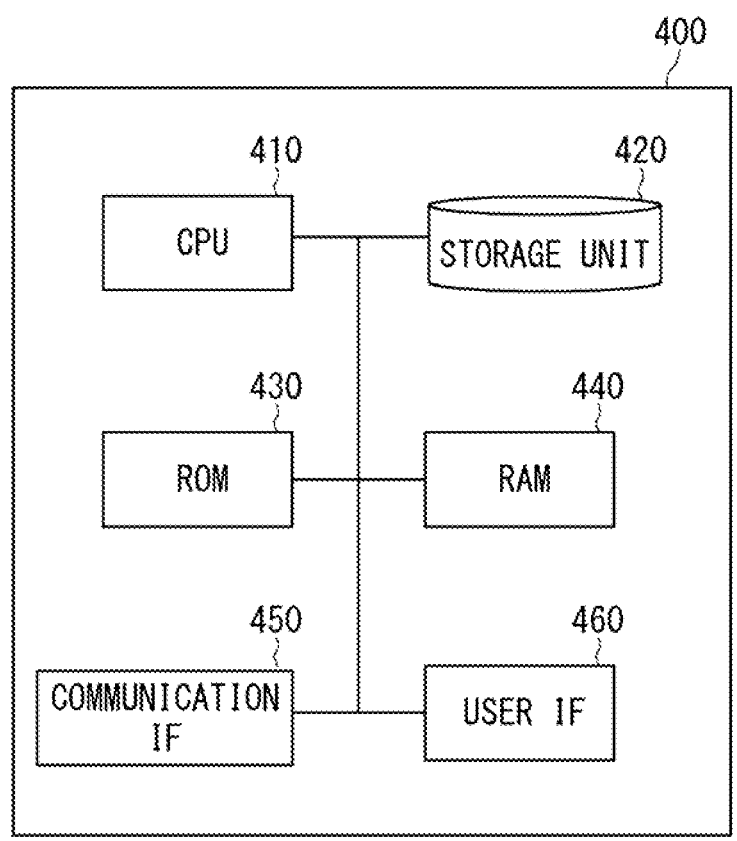
FIG. 18 is a block diagram illustrating a configuration example of a computer apparatus.

FIG. 18 illustrates a configuration example of a computer apparatus that can be used as the PC 160. A computer apparatus 400 includes a control unit (CPU: Central Processing Unit) 410, a storage unit 420, a Read Only Memory (ROM) 430, a Random Access Memory (RAM) 440, a communication interface (IF) 450, and a user interface 460.

The communication interface 450 is an interface to which four sequences of received signals, which are output from the ADC 153, are input. The user interface 460 includes a display unit such as a display, for example. The user interface 460 includes an input unit such as a keyboard, a mouse, and a touch panel.

The storage unit 420 is an auxiliary storage device capable of holding various types of data. The storage unit 420 does not necessarily have to be a part of the computer apparatus 400, and may be an external storage device or a cloud storage connected to the computer apparatus 400 via a network.

The ROM 430 is a nonvolatile storage device. For example, a semiconductor memory device such as a flash memory having a relatively small capacity is used for the ROM 430. The program to be executed by the CPU 410 may be stored in the storage unit 420 or the ROM 430. The storage unit 420 or the ROM 430 stores various programs for causing the CPU 410 to perform processing of performing distortion compensation and detection.

The program for causing the CPU (processor) 410 to perform processing of performing distortion compensation and detection may be stored by using various types of non-transitory computer readable media and supplied to a computer. Non-transitory computer readable media include tangible storage media of various types. Examples of the non-transitory computer readable media include magnetic recording media such as, for example, flexible disks, magnetic tape, or hard disks, magneto-optical recording media such as, for example, magneto-optical disks, optical disk media such as compact disc (CD) or digital versatile disk (DVD), and semi-conductor memory such as mask ROM, programmable ROM (PROM), erasable PROM (EPROM), flash ROM, or RAM. The program may also be supplied to a computer by using various types of transitory computer readable media. Examples of the transitory computer readable media include electrical signals, optical signals, and electromagnetic waves. The transitory computer readable medium can supply the program to the computer via a wired communication path such as an electric wire and an optical fiber, or a wireless communication path.

The RAM 440 is a volatile storage device. Various types of semiconductor memory devices such as Dynamic Random Access Memory (DRAM) and Static Random Access Memory (SRAM) are used for the RAM 440. The RAM 440 may be used as an internal buffer for temporarily storing data and the like. The CPU 410 loads a program stored in the storage unit 420 or the ROM 430 into the RAM 440 and executes the program. The CPU 410 may have an internal buffer capable of temporarily storing data and the like.

While the example embodiments of the present disclosure have been explained in detail above, the present disclosure is not limited to the above-described example embodiments, and changes and modifications to the above-described example embodiments without departing from the spirit of the present disclosure are also included in the present disclosure.

For example, some or all of the above-described example embodiments may be described as follows, but are not limited thereto.

[Supplementary Note 1]

A receiver including:
  a coherent receiving circuit configured to coherently receive a signal transmitted via a transmission line;
  a filter group with a first widely linear (WL) filter, a filter layer, and a: second WL filter that are connected in tandem, the first WL filter compensating for in-receiver distortion occurring in the signal at a receiver, the filter layer including one or more filters that compensate for distortion included in the signal, the second WL filter compensating for in-transmitter distortion occurring in the signal at a transmitter configured to transmit the signal;
  a coefficient updating means for adaptively controlling filter coefficients of the first WL filter and the second WL filter by using an error back propagation method, based on a difference between an output signal being output from the filter group and a predetermined value of the output signal;
  a first distortion detection means for detecting in-receiver distortion after convergence of the filter coefficients, based on a filter coefficient of the first WL filter; and
  a second distortion estimation means for detecting in-transmitter distortion after convergence of the filter coefficients, based on a filter coefficient of the second WL filter.

[Supplementary Note 2]

The receiver according to Supplementary note 1, wherein
  a signal to be received by the coherent receiving circuit is a polarization multiplexed signal, and
  the coherent receiving circuit outputs a signal indicating an in-phase component and a quadrature component of a first polarization with respect to local oscillator light, and a signal indicating an in-phase component and a quadrature component of a second polarization with respect to local oscillator light.

[Supplementary Note 3]

The receiver according to Supplementary note 2, wherein the first distortion detection means detects at least one of an IQ imbalance indicating a mismatch in average signal strength between the in-phase component and the quadrature component, an IQ skew indicating a time lag between the in-phase component and the quadrature component, or an IQ phase shift indicating a quadrature shift between the in-phase component and the quadrature component, as the in-receiver distortion.

[Supplementary Note 4]

The receiver according to Supplementary note 3, wherein the first distortion detection means includes a signal conversion means for converting a filter coefficient of the first WL filter into a signal in a frequency domain, and detects at least one of the IQ imbalance, the IQ skew, or the IQ phase shift, based on the converted signal in the frequency domain.

[Supplementary Note 5]

The receiver according to any one of Supplementary notes 2 to 4, wherein the second distortion detection means detects at least one of an IQ imbalance indicating a mismatch in average signal strength between the in-phase component and the quadrature component, an IQ skew indicating a time lag between the in-phase component and the quadrature component, or an IQ phase shift indicating a quadrature shift between the in-phase component and the quadrature component, as the in-receiver distortion.

[Supplementary Note 6]

The receiver according to Supplementary note 5, wherein the second distortion detection means includes a signal conversion means for converting a filter coefficient of the second WL filter into a signal in a frequency domain, and detects at least one of the IQ imbalance, the IQ skew, or the IQ phase shift, based on the converted signal in the frequency domain.

[Supplementary Note 7]

The receiver according to any one of Supplementary notes 2 to 6, wherein the first WL filter and the second WL filter each include a WL 4×2 multiple-input and multiple-output (MIMO) filter with a complex signal acquired by converting the in-phase component and the quadrature component into complex data, and a complex conjugate of the complex signal as inputs for each of the first polarization and the second polarization.

[Supplementary Note 8]

The receiver according to any one of Supplementary notes 2 to 6, wherein the first WL filter and the second WL filter each have a real coefficient 4×4 multiple-input and multiple-output (MIMO) filter with the in-phase component and the quadrature component as inputs for each of the first polarization and the second polarization.

[Supplementary Note 9]

The receiver according to any one of Supplementary notes 1 to 8, wherein one or more filters included in the filter layer compensate for occurrence in the signal in the transmission line.

[Supplementary Note 10]

The receiver according to any one of Supplementary notes 1 to 9, wherein the filter layer includes a wavelength dispersion compensating filter, a polarization fluctuation compensating filter, and a carrier phase compensating filter that are connected in tandem.

[Supplementary Note 11]

The receiver according to Supplementary note 10, wherein the coefficient updating means further adaptively controls a filter coefficient of the polarization fluctuation compensating filter, based on the difference.

[Supplementary Note 12]

A communication system including
a transmitter configured to transmit a signal via a transmission line and
a receiver configured to receive the transmitted signal, wherein the receiver includes:
a coherent receiving circuit configured to coherently receive the signal;
a filter group having a first widely linear (WL) filter, a filter layer, and a second WL filter that are connected in tandem, the first WL filter compensating for in-receiver distortion occurring in the signal at the receiver, the filter layer including one or more filters that compensate for distortion included in the signal, the second WL filter compensating for in-transmitter distortion occurring in the signal at the transmitter;
a coefficient updating means for adaptively controlling filter coefficients of the first WL filter and the second WL filter by using an error back propagation method, based on a difference between an output signal being output from the filter group and a predetermined value of the output signal;
a first distortion detection means for detecting in-receiver distortion after convergence of the filter coefficients, based on a filter coefficient of the first WL filter; and
a second distortion estimation means for detecting in-transmitter distortion after convergence of the filter coefficients, based on a filter coefficient of the second WL filter.

[Supplementary Note 13]

The communication system according to Supplementary note 12, wherein
the transmitter transmits a polarization multiplexed signal, and
the coherent receiving circuit outputs a signal indicating an in-phase component and a quadrature component of a first polarization with respect to local oscillator light, and a signal indicating an in-phase component and a quadrature component of a second polarization with respect to local oscillator light.

[Supplementary Note 14]

The communication system according to Supplementary note 13, wherein the first distortion detection means detects at least one of an IQ imbalance indicating a mismatch in average signal strength between the in-phase component and the quadrature component, an IQ skew indicating a time lag between the in-phase component and the quadrature component, or an IQ phase shift indicating a quadrature shift between the in-phase component and the quadrature component, as the in-receiver distortion.

[Supplementary Note 15]

The communication system according to Supplementary note 14, wherein the first distortion detection means includes a signal conversion means for converting a filter coefficient of the first WL filter into a signal in a frequency domain, and detects at least one of the IQ imbalance, the IQ skew, or the IQ phase shift, based on the converted signal in the frequency domain.

[Supplementary Note 16]

The communication system according to Supplementary note 13, wherein the second distortion detection means detects at least one of an IQ imbalance indicating a mismatch in average signal strength between the in-phase component and the quadrature component, an IQ skew indicating a time lag between the in-phase component and the quadrature component, or an IQ phase shift indicating a quadrature shift between the in-phase component and the quadrature component, as the in-receiver distortion.

[Supplementary Note 17]

The communication system according to Supplementary note 16, wherein the second distortion detection means includes a signal conversion means for converting a filter coefficient of the second WL filter into a signal in a frequency domain, and detects at least one of the IQ imbalance, the IQ skew, or the IQ phase shift, based on the converted signal in the frequency domain.

[Supplementary Note 18]

A distortion detection device including:
a coefficient updating means for adaptively controlling filter coefficients of a first widely linear (WL) filter and a second WL filter by using an error back propagation method, based on a difference between an output signal being output from a filter group and a predetermined value of the output signal, the first WL filter compensating for in-receiver distortion occurring in a signal transmitted via a transmission line at a receiver configured to coherently receive the signal, the second WL filter compensating for in-transmitter distortion occurring in the signal at a transmitter configured to transmit the signal, the filter group having the first WL filter, a filter layer, and the second WL filter that are connected in tandem, the filter layer including one or more filters that compensate for distortion included in the signal;
a first distortion detection means for detecting in-receiver distortion after convergence of the filter coefficients, based on a filter coefficient of the first WL filter; and
a second distortion estimation means for detecting in-transmitter distortion after convergence of the filter coefficients, based on a filter coefficient of the second WL filter.

[Supplementary Note 19]

The distortion detection device according to Supplementary note 18, wherein
the signal transmitted via the transmission line is a polarization multiplexed signal, and
the receiver generates a signal indicating an in-phase component and a quadrature component of a first polarization with respect to local oscillator light, and a signal indicating an in-phase component and a quadrature component of a second polarization with respect to local oscillator light.

[Supplementary Note 20]

The distortion detection device according to Supplementary note 19, wherein the first distortion detection means detects at least one of an IQ imbalance indicating a mismatch in average signal strength between the in-phase component and the quadrature component, an IQ skew indicating a time lag between the in-phase component and the quadrature component, or an IQ phase shift indicating a quadrature shift between the in-phase component and the quadrature component, as the in-receiver distortion.

[Supplementary Note 21]

The distortion detection device according to Supplementary note 20, wherein the first distortion detection means includes a signal conversion means for converting a filter coefficient of the first WL filter into a signal in a frequency domain, and detects at least one of the IQ imbalance, the IQ skew, or the IQ phase shift, based on the converted signal in the frequency domain.

[Supplementary Note 22]

The distortion detection device according to Supplementary note 19, wherein the second distortion detection means detects at least one of an IQ imbalance indicating a mismatch in average signal strength between the in-phase component and the quadrature component, an IQ skew indicating a time lag between the in-phase component or the quadrature component, and an IQ phase shift indicating a quadrature shift between the in-phase component and the quadrature component, as the in-receiver distortion.

[Supplementary Note 23]

The distortion detection device according to Supplementary note 22, wherein the second distortion detection means includes a signal conversion means for converting a filter coefficient of the second WL filter into a signal in a frequency domain, and detects at least one of the IQ imbalance, the IQ skew, or the IQ phase shift, based on the converted signal in the frequency domain.

[Supplementary Note 24]

The distortion detection device according to any one of Supplementary notes 18 to 23, further including the filter group.

[Supplementary Note 25]

A distortion detection method including:
adaptively controlling filter coefficients of a first widely linear (WL) filter and a second WL filter by using an error back propagation method, based on a difference between an output signal being output from a filter group and a predetermined value of the output signal, the first WL filter compensating for in-receiver distortion occurring in a signal transmitted via a transmission line at a receiver configured to coherently receive the signal, the second WL filter compensating for in-transmitter distortion occurring in the signal at a transmitter configured to transmit the signal, the filter group having the first WL filter, a filter layer, and the second WL filter that are connected in tandem, the filter layer including one or more filters that compensate for distortion included in the signal;
detecting, after convergence of the filter coefficients, in-receiver distortion, based on a filter coefficient of the first WL filter; and
detecting, after convergence of the filter coefficients, in-transmitter distortion, based on a filter coefficient of the second WL filter.

[Supplementary Note 26]

A program for causing a processor to execute processing of:
adaptively controlling filter coefficients of a first widely linear (WL) filter and a second WL filter by using an error back propagation method, based on a difference between an output signal being output from a filter group and a predetermined value of the output signal, the first WL filter compensating for in-receiver distortion occurring in a signal transmitted via a transmission line at a receiver configured to coherently receive the signal, the second WL filter compensating for in-transmitter distortion occurring in the signal at a transmitter configured to transmit the signal, the filter group having the first WL filter, a filter layer, and the second WL filter that are connected in tandem, the filter layer including one or more filters that compensate for distortion included in the signal;
detecting, after convergence of the filter coefficients, in-receiver distortion, based on a filter coefficient of the first WL filter; and
detecting, after convergence of the filter coefficients, in-transmitter distortion, based on a filter coefficient of the second WL filter.

This application is based upon and claims the benefit of priority from Japanese Patent Application No. 2020-180884, filed on Oct. 28, 2020, the disclosure of which is incorporated herein in its entirety.

REFERENCE SIGNS LIST

10 Communication System
11 Transmitter
13 Transmission Line
15 Receiver
21 Coherent Receiving Circuit
22 Filter Group
23 First WL Filter
24 Filter Layer
25 Second WL Filter
26 Coefficient Updating Means
27 First Distortion Detection Means
28 Second Distortion Detection Means
100 Optical Fiber Communication System
110 Optical Transmitter
111 Encoding Unit
112 Pre-Equalization Unit
113 DAC
114 Optical Modulator
115 LD
130 Transmission Line
132 Optical Fiber
133 Optical Amplifier
150 Optical Receiver
151 LD
152 Coherent Receiver
153 ADC
154 Demodulation Unit
155 Decoding Unit
156 Distorsion Estimation Unit
160 PC
161 First WL Filter
162 Filter Layer
163 Second WL Filter
164 Loss Function Calculating Unit
165 Coefficient Updating Unit
166 In-Receiver Distortion Detection Unit
167 In-Transmitter Distortion Detection Unit
171 In-Receiver Distortion Compensating Filter
172 Wavelength Dispersion Compensating Filter
173 Polarization Fluctuation Compensating Filter
174 Carrier Phase Compensating Filter
175 In-Transmitter Distortion Compensating Filter
176 Loss Function Calculating Unit
177 Coefficient Updating Unit
178 In-Receiver Distortion Detection Unit
179 In-Transmitter Distortion Detection Unit
191-195 Gradient Deriving Unit
201, 203, 205 Coefficient Update Amount Calculating Unit
211-214, 221-224 FFT Unit
215, 225 IQ Skew Detection Unit
216, 226 IQ Imbalance Detection Unit
217, 227 IQ Phase Shift Detection Unit

What is claimed is:

1. A receiver comprising:
a coherent receiver configured to coherently receive a signal transmitted via a transmission line;
a filter group having a first widely linear (WL) filter, a filter layer, and a second WL filter that are connected in tandem, the first WL filter compensating for in-receiver distortion occurring in the signal at a receiver, the filter layer including one or more filters that compensate for distortion included in the signal, the second WL filter compensating for in-transmitter distortion occurring in the signal at a transmitter configured to transmit the signal;
a processor configured to execute instructions to:
adaptively control filter coefficients of the first WL filter and the second WL filter by using an error back propagation method, based on a difference between an output signal being output from the filter group and a predetermined value of the output signal;
detect in-receiver distortion after convergence of the filter coefficients, based on a filter coefficient of the first WL filter; and
detect in-transmitter distortion after convergence of the filter coefficients, based on a filter coefficient of the second WL filter.

2. The receiver according to claim 1, wherein
a signal to be received by the coherent receiver is a polarization multiplexed signal, and
the coherent receiver outputs a signal indicating an in-phase component and a quadrature component of a first polarization with respect to local oscillator light, and a signal indicating an in-phase component and a quadrature component of a second polarization with respect to local oscillator light.

3. The receiver according to claim 2, wherein the processor is configured to execute the instructions to detect at least one of an IQ imbalance indicating a mismatch in average signal strength between the in-phase component and the quadrature component, an IQ skew indicating a time lag between the in-phase component and the quadrature component, or an IQ phase shift indicating a quadrature shift between the in-phase component and the quadrature component, as the in-receiver distortion.

4. The receiver according to claim 3, wherein the processor is configured to execute the instructions to convert a filter coefficient of the first WL filter into a signal in a frequency domain, and detect at least one of the IQ imbalance, the IQ skew, or the IQ phase shift as the in-receiver distortion, based on the converted signal in the frequency domain.

5. The receiver according to claim 2, wherein the processor is configured to execute the instructions to detect at least one of an IQ imbalance indicating a mismatch in average signal strength between the in-phase component and the quadrature component, an IQ skew indicating a time lag between the in-phase component and the quadrature component, or an IQ phase shift indicating a quadrature shift between the in-phase component and the quadrature component, as the in-transmitter distortion.

6. The receiver according to claim 5, wherein the processor is configured to execute the instructions to convert a filter coefficient of the second WL filter into a signal in a frequency domain, and detect at least one of the IQ imbalance, the IQ skew, or the IQ phase shift as the in-transmitter distortion, based on the converted signal in the frequency domain.

7. The receiver according to claim 2, wherein the first WL filter and the second WL filter each have a WL 4×2 multiple-input and multiple-output (MIMO) filter with a complex signal acquired by converting the in-phase component and the quadrature component into complex data, and a complex conjugate of the complex signal as inputs for each of the first polarization and the second polarization.

8. The receiver according to claim 2, wherein the first WL filter and the second WL filter each have a real coefficient 4×4 multiple-input and multiple-output (MIMO) filter with the in-phase component and the quadrature component as inputs for each of the first polarization and the second polarization.

9. The receiver according to claim 1, wherein one or more filters included in the filter layer compensate for distortion that occurs in the signal in the transmission line.

10. The receiver according to claim 1, wherein the filter layer includes a wavelength dispersion compensating filter, a polarization fluctuation compensating filter, and a carrier phase compensating filter that are connected in tandem.

11. The receiver according to claim 10, wherein the processor is further configured to execute the instructions to adaptively control a filter coefficient of the polarization fluctuation compensating filter, based on the difference.

12. A communication system comprising:
a transmitter configured to transmit a signal via a transmission line; and
the receiver according to claim 1.

13. The communication system according to claim 12, wherein
the transmitter transmits a polarization multiplexed signal, and
the coherent receiver outputs a signal indicating an in-phase component and a quadrature component of a first polarization with respect to local oscillator light, and a signal indicating an in-phase component and a quadrature component of a second polarization with respect to local oscillator light.

14. The communication system according to claim 13, wherein the processor is configured to detect at least one of an IQ imbalance indicating a mismatch in average signal strength between the in-phase component and the quadrature component, an IQ skew indicating a time lag between the in-phase component and the quadrature component, or an IQ phase shift indicating a quadrature shift between the in-phase component and the quadrature component, as the in-receiver distortion.

15. The communication system according to claim 14, wherein the processor is configured to execute the instructions to convert a filter coefficient of the first WL filter into a signal in a frequency domain, and detect at least one of the IQ imbalance, the IQ skew, or the IQ phase shift as the in-receiver distortion, based on the converted signal in the frequency domain.

16. The communication system according to claim 13, wherein the processor is configured to execute the instructions to detect at least one of an IQ imbalance indicating a mismatch in average signal strength between the in-phase component and the quadrature component, an IQ skew indicating a time lag between the in-phase component and the quadrature component, or an IQ phase shift indicating a quadrature shift between the in-phase component and the quadrature component, as the in-transmitter distortion.

17. The communication system according to claim 16, wherein the processor is configured to execute the instructions to convert a filter coefficient of the second WL filter into a signal in a frequency domain, and detect at least one of the IQ imbalance, the IQ skew, or the IQ phase shift as the in-transmitter distortion, based on the converted signal in the frequency domain.

18. A distortion detection device comprising:
a memory storing instructions; and
a processor configured to execute the instructions to:
adaptively control filter coefficients of a first widely linear (WL) filter and a second WL filter by using an error back propagation method, based on a difference between an output signal being output from a filter group and a predetermined value of the output signal, the first WL filter compensating for in-receiver distortion occurring in a signal transmitted via a transmission line at a receiver configured to coherently receive the signal, the second WL filter compensating for in-transmitter distortion occurring in the signal at a transmitter configured to transmit the signal, the filter group having the first WL filter, a filter layer, and the second WL filter that are connected in tandem, the filter layer including one or more filters that compensate for distortion included in the signal;
detect in-receiver distortion after convergence of the filter coefficients, based on a filter coefficient of the first WL filter; and
detect in-transmitter distortion after convergence of the filter coefficients, based on a filter coefficient of the second WL filter.

19. The distortion detection device according to claim 18, wherein
the signal transmitted via the transmission line is a polarization multiplexed signal, and
the receiver generates a signal indicating an in-phase component and a quadrature component of a first polarization with respect to local oscillator light and a signal indicating an in-phase component and a quadrature component of a second polarization with respect to local oscillator light.

20. A distortion detection method comprising:
adaptively controlling filter coefficients of a first widely linear (WL) filter and a second WL filter by using an error back propagation method, based on a difference between an output signal being output from a filter group and a predetermined value of the output signal, the first WL filter compensating for in-receiver distortion occurring in a signal transmitted via a transmission line at a receiver configured to coherently receive the signal, the second WL filter compensating for in-transmitter distortion occurring in the signal at a transmitter configured to transmit the signal, the filter group having the first WL filter, a filter layer, and the second WL filter that are connected in tandem, the filter layer including one or more filters that compensate for distortion included in the signal;
detecting, after convergence of the filter coefficients, in-receiver distortion, based on a filter coefficient of the first WL filter; and
detecting, after convergence of the filter coefficients, in-transmitter distortion, based on a filter coefficient of the second WL filter.

* * * * *